United States Patent
Miklós et al.

(10) Patent No.: US 9,635,702 B2
(45) Date of Patent: Apr. 25, 2017

(54) METHOD AND APPARATUS FOR REDUCING SIGNALING IN A CORE NETWORK

(71) Applicant: Telefonaktiebolaget L M Ericsson (publ), Stockholm (SE)

(72) Inventors: György Miklós, Pilisborosjenö (HU); Lars-Bertil Olsson, Angered (SE); Hans Bertil Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/418,111

(22) PCT Filed: Jul. 30, 2013

(86) PCT No.: PCT/SE2013/050939
§ 371 (c)(1),
(2) Date: Jan. 29, 2015

(87) PCT Pub. No.: WO2014/021770
PCT Pub. Date: Feb. 6, 2014

(65) Prior Publication Data
US 2015/0173121 A1 Jun. 18, 2015

Related U.S. Application Data

(60) Provisional application No. 61/678,906, filed on Aug. 2, 2012.

(51) Int. Cl.
*H04W 76/04* (2009.01)
*H04W 76/06* (2009.01)
(Continued)

(52) U.S. Cl.
CPC ......... *H04W 76/046* (2013.01); *H04W 68/00* (2013.01); *H04W 76/048* (2013.01); *H04W 76/068* (2013.01); *H04W 68/02* (2013.01)

(58) Field of Classification Search
None
See application file for complete search history.

(56) References Cited

U.S. PATENT DOCUMENTS

| 7,529,354 B2 * | 5/2009 | Kiss ................. H04L 29/06027 |
|---|---|---|
| | | 379/93.01 |
| 8,996,039 B2 * | 3/2015 | Al ........................ H04W 68/02 |
| | | 455/456.1 |

(Continued)

FOREIGN PATENT DOCUMENTS

| CN | WO 2010035971 A2 * | 4/2010 | ............ H04W 8/082 |
|---|---|---|---|
| EP | 1 874 070 | 1/2008 | |
| WO | WO 2010/035971 | 4/2010 | |

OTHER PUBLICATIONS

PCT Written Opinion of the International Searching Authority for International application No. PCT/SE2013/050939, Apr. 16, 2014.
(Continued)

*Primary Examiner* — Bunjob Jaroenchonwanit
(74) *Attorney, Agent, or Firm* — Baker Botts, LLP

(57) ABSTRACT

The disclosure relates to a method and apparatus in telecommunications, and particularly to reducing signaling in a core network involved in changes of states of a wireless terminal (4). According to the disclosure a reduced context is allocated based on parameters received by a base station (2). The reduced context is used by the base station for reconfiguring a RRC connection between the wireless terminal (4) and the base station (2) by means of the reduced context, such that the signaling is hidden from a Serving GateWay, SGW (10).

16 Claims, 20 Drawing Sheets

(51) Int. Cl.
*H04W 68/00* (2009.01)
*H04W 68/02* (2009.01)

(56) References Cited

U.S. PATENT DOCUMENTS

| | | | | |
|---|---|---|---|---|
| 2004/0152482 | A1* | 8/2004 | Raffel | H04W 16/16 455/522 |
| 2006/0095961 | A1* | 5/2006 | Govindarajan | H04L 63/1416 726/15 |
| 2006/0171410 | A1* | 8/2006 | Jung | H04L 12/40143 370/447 |
| 2008/0181168 | A1* | 7/2008 | Han | H04B 7/155 370/315 |
| 2009/0196228 | A1* | 8/2009 | Kim | H04W 60/04 370/328 |
| 2010/0022257 | A1* | 1/2010 | Koskela | H04W 68/025 455/458 |
| 2010/0178941 | A1* | 7/2010 | Chun | H04L 1/1832 455/458 |
| 2010/0195621 | A1* | 8/2010 | Kekki | H04W 48/17 370/332 |
| 2010/0260096 | A1* | 10/2010 | Ulupinar | H04B 7/2606 370/315 |
| 2011/0075675 | A1* | 3/2011 | Koodli | H04L 12/14 370/401 |
| 2011/0235605 | A1* | 9/2011 | Yeoum | H04W 72/04 370/329 |
| 2011/0243003 | A1* | 10/2011 | Oguchi | H04W 76/028 370/252 |
| 2012/0076099 | A1* | 3/2012 | Yin | H04L 12/4633 370/329 |
| 2012/0093086 | A1* | 4/2012 | Yin | H04L 69/16 370/328 |
| 2012/0106423 | A1* | 5/2012 | Nylander | H04W 52/0241 370/311 |
| 2012/0113843 | A1* | 5/2012 | Watfa | H04W 72/1289 370/252 |
| 2012/0155404 | A1* | 6/2012 | Shin | H04W 60/04 370/329 |
| 2012/0214487 | A1* | 8/2012 | Xie | H04W 60/00 455/435.1 |
| 2012/0224536 | A1* | 9/2012 | Hahn | H04L 45/00 370/328 |
| 2012/0275430 | A1* | 11/2012 | Wang | H04W 24/04 370/331 |
| 2013/0260740 | A1* | 10/2013 | Rayavarapu | H04W 76/046 455/422.1 |
| 2014/0128110 | A1* | 5/2014 | Wang | H04W 60/04 455/458 |
| 2014/0169251 | A1* | 6/2014 | Lee | H04W 68/02 370/311 |
| 2014/0177596 | A1* | 6/2014 | Watfa | H04W 36/0022 370/331 |
| 2014/0213267 | A1* | 7/2014 | Chai | H04W 76/028 455/450 |
| 2015/0223198 | A1* | 8/2015 | Du | H04W 52/0203 455/458 |
| 2015/0304988 | A1* | 10/2015 | Jin | H04W 68/02 455/458 |
| 2016/0029433 | A1* | 1/2016 | Jeong | H04W 52/0216 370/311 |
| 2016/0066296 | A1* | 3/2016 | Su | H04W 68/005 455/458 |
| 2016/0072852 | A1* | 3/2016 | Keller | H04L 65/1016 370/352 |
| 2016/0100362 | A1* | 4/2016 | Palanisamy | H04W 52/0212 370/311 |

OTHER PUBLICATIONS

PCT International Search Report for International application No. PCT/SE2013/050939, Apr. 16, 2014.

* cited by examiner

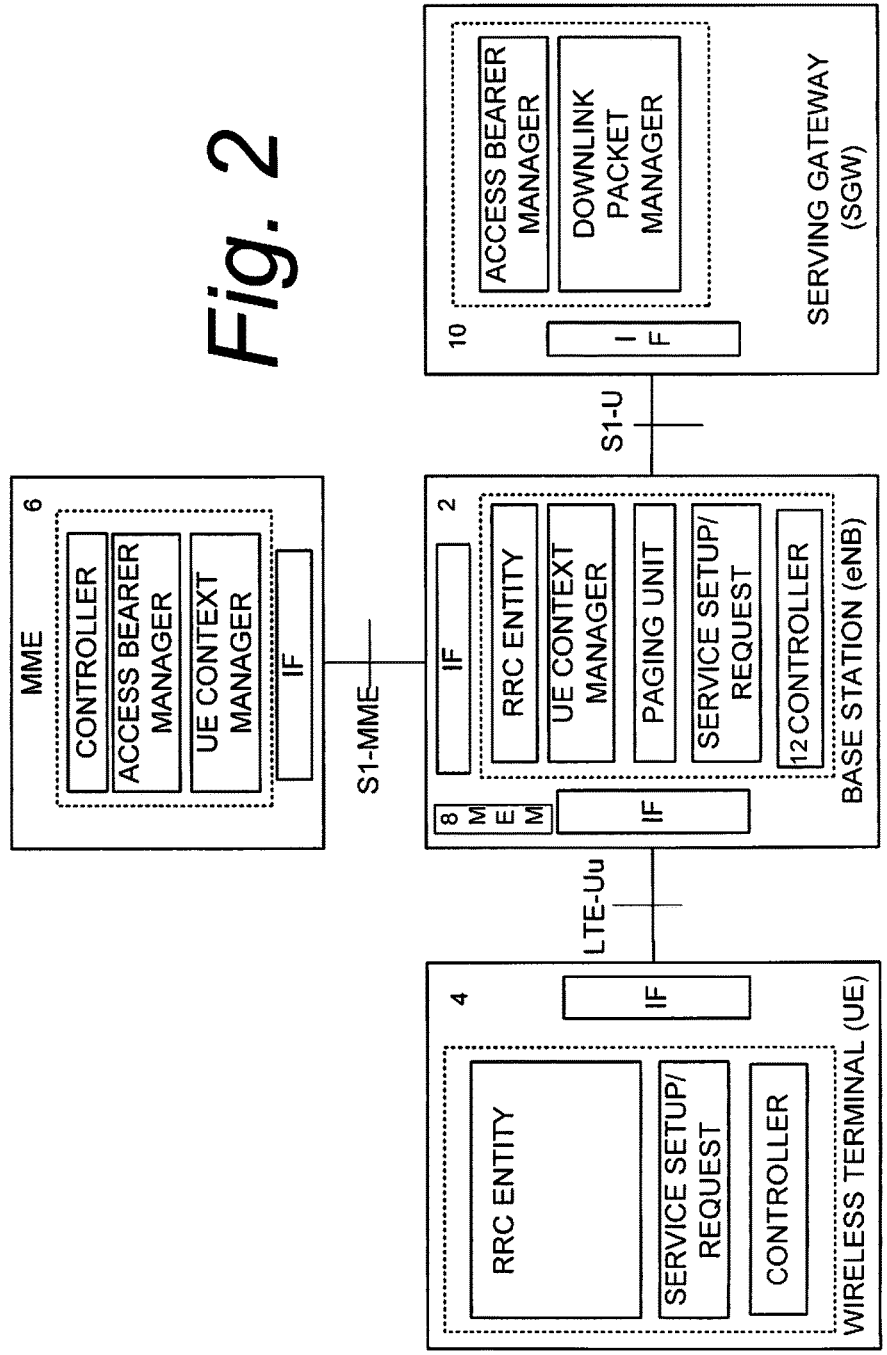

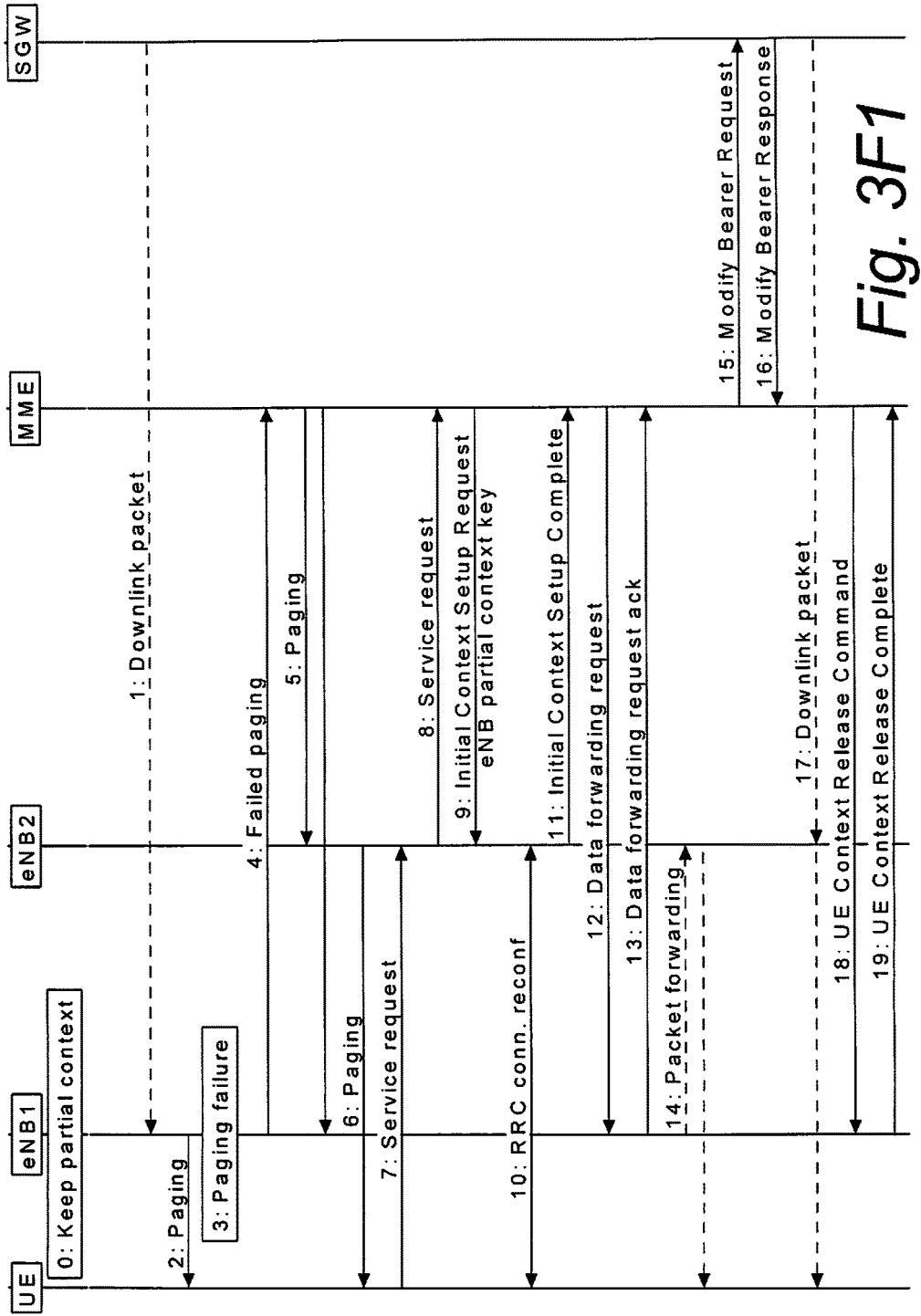

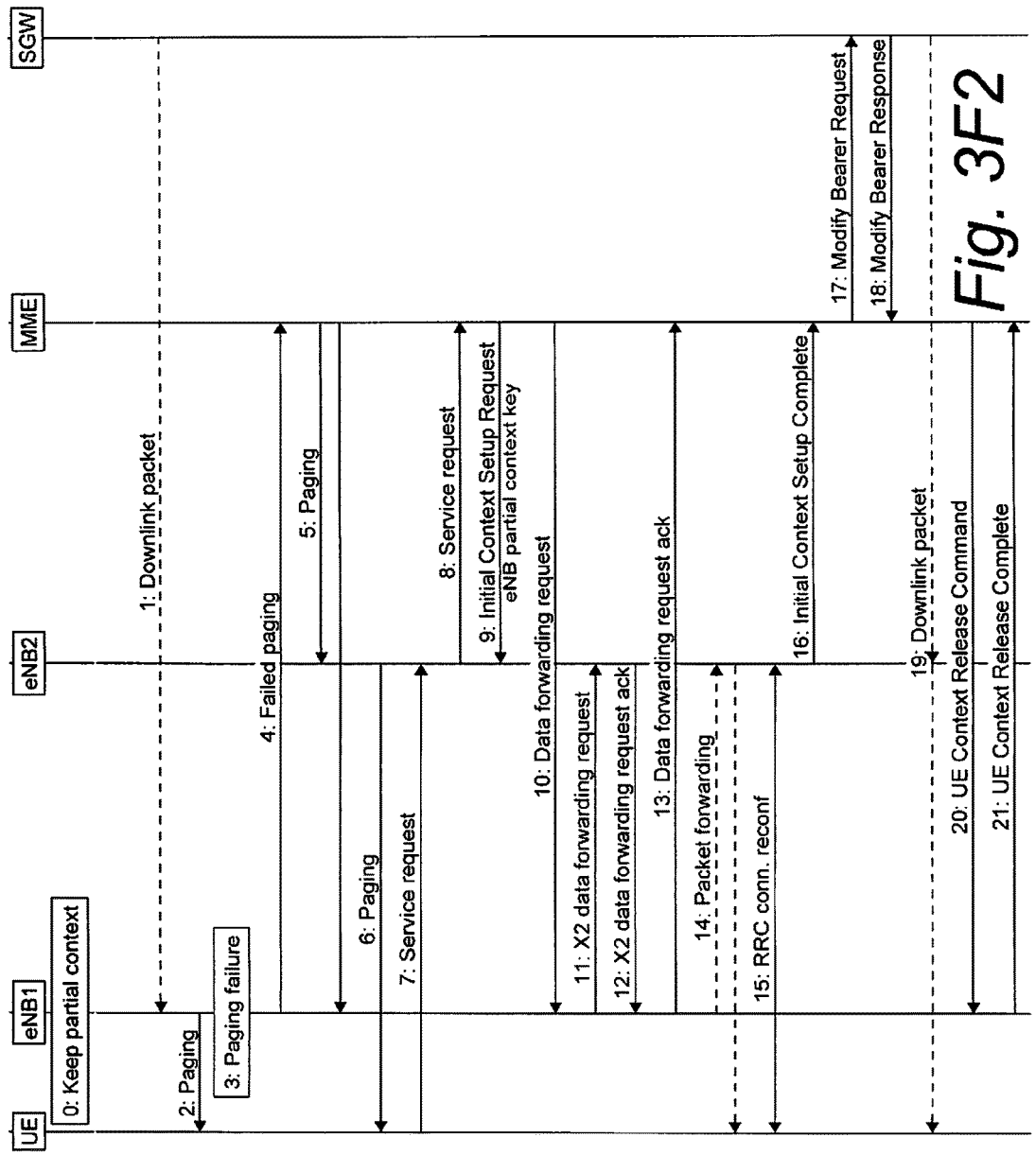
Fig. 3F2

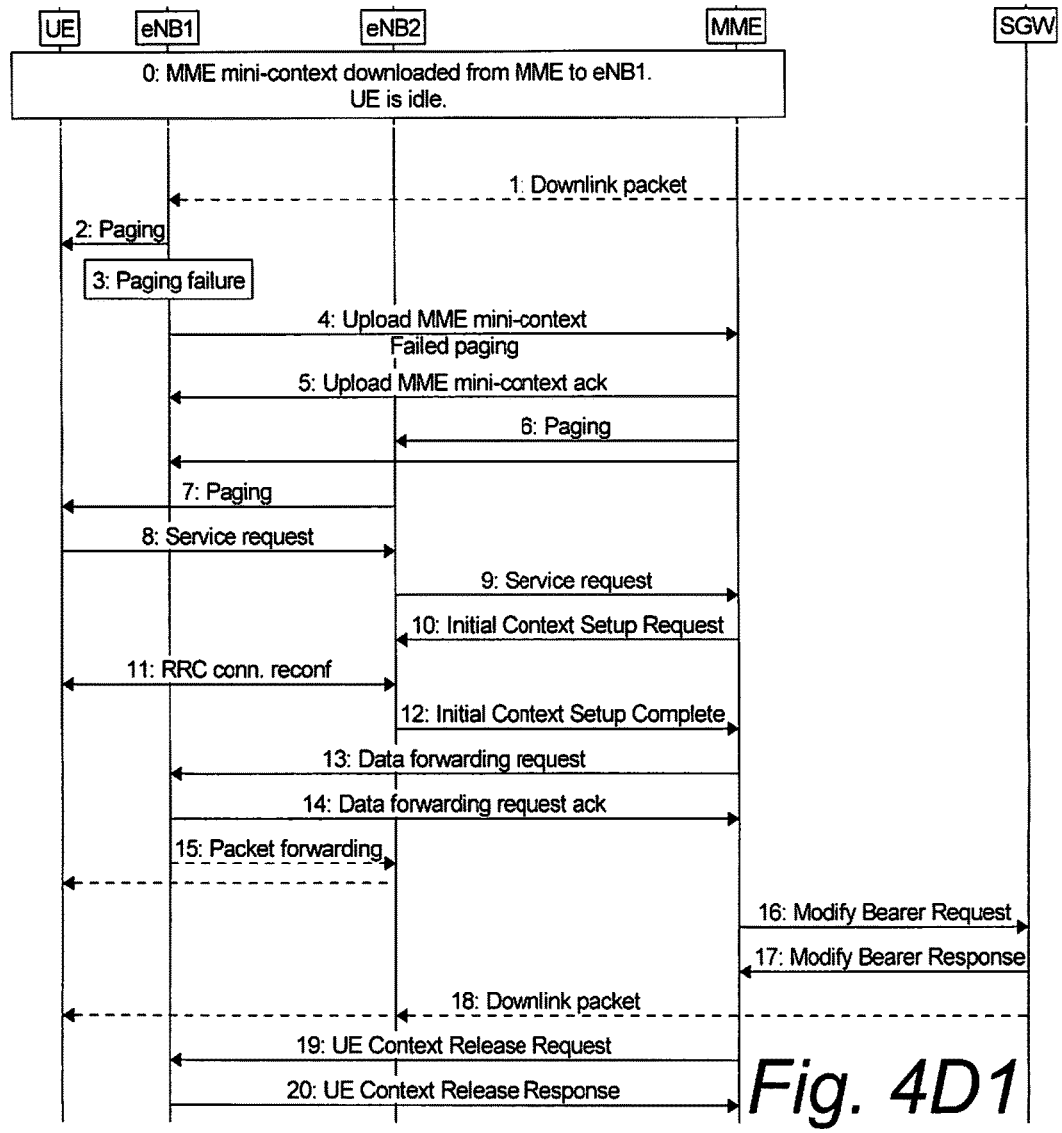
Fig. 4D1

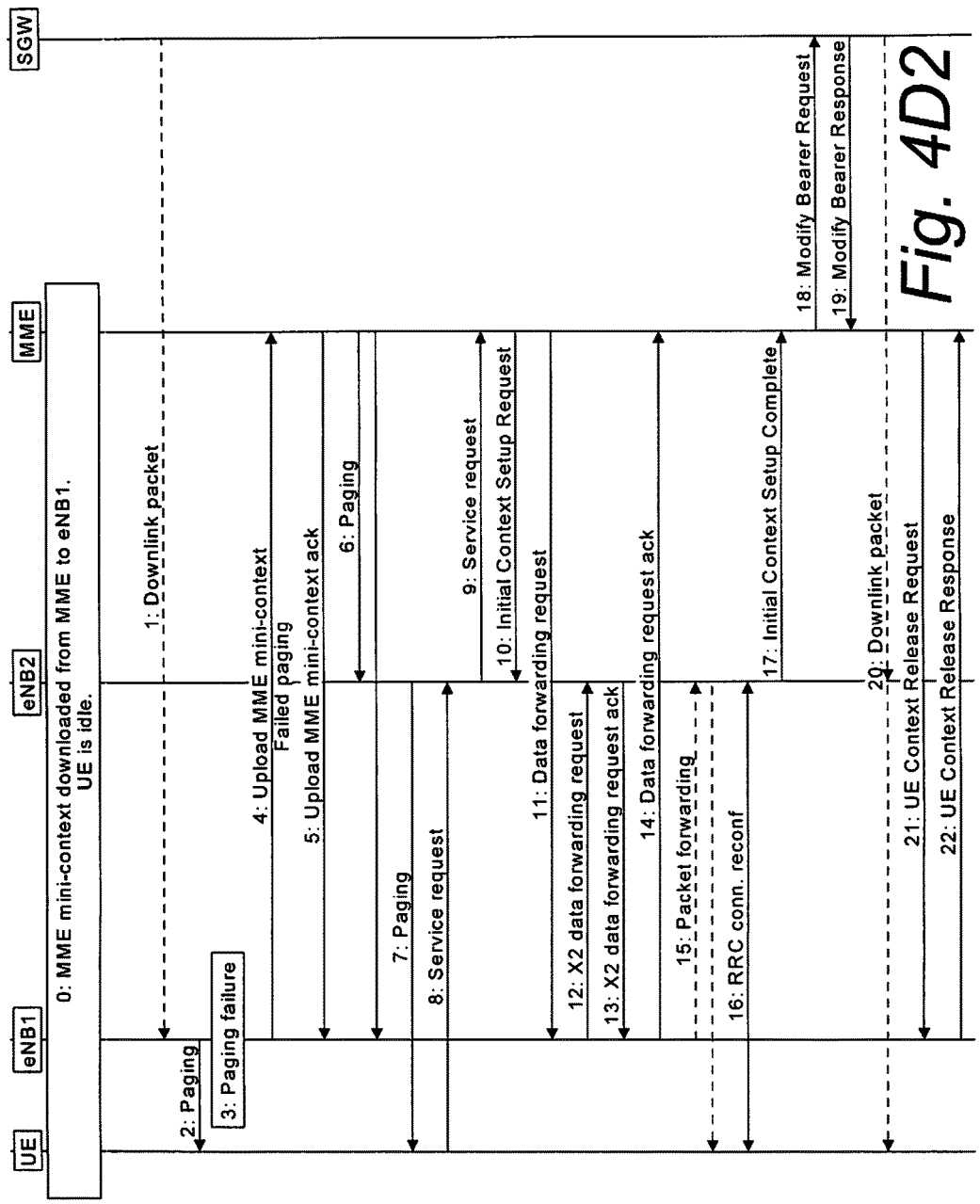
Fig. 4D2

METHOD AND APPARATUS FOR REDUCING SIGNALING IN A CORE NETWORK

PRIORITY

This nonprovisional application is a U.S. National Stage Filing under 35 U.S.C. §371 of International Patent Application Serial No. PCT/SE2013/050939, filed Jul. 30, 2013 and entitled "METHOD AND APPARATUS FOR REDUCING SIGNALING IN A CORE NETWORK" which claims priority to U.S. Provisional Patent Application No. 61/678,906 filed Aug. 2, 2012, both of which are hereby incorporated by reference in their entirety.

TECHNICAL FIELD

The technology relates to telecommunications, and particularly to handling signaling in a core network involved in changes of states of a wireless terminal.

BACKGROUND

In a typical cellular radio system, wireless terminals (also known as mobile stations and/or user equipments (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. The 3GPP has developed specifications for the Evolved Packet System (EPS). The Evolved Packet System comprises an Evolved Universal Terrestrial Radio Access Network (E-UTRAN), also known as Long Term Evolution (LTE) access technology and Evolved Packet Core (EPC). Long Term Evolution (LTE) is a variant of a 3GPP radio access technology wherein the radio base station nodes are connected to a core network rather than to radio network controller (RNC) nodes.

A main component of the EPS is the Evolved Packet Core (EPC), also known as SAE Core. The EPC serves as equivalent of GPRS networks via the Mobility Management Entity (MME), Serving Gateway (SGW) and Packet Data Network (PDN) Gateway subcomponents, each discussed briefly below.

FIG. 1 shows an example implementation of the aforementioned Evolved Packet System as comprising for example the E-UTRAN and the Mobility Management Entity (MME) in the EPC. The mobility management entity (MME) handles various control functions. The nodes and LTE/SAE or Evolved Packet System (EPS) architecture of FIG. 1 and other architecture scenarios are understood with reference to 3GPP TS 23.401, which provides, e.g., a system architecture description.

In some of its implementations, the E-UTRAN may comprise a number of different base stations, e.g., eNodeBs (eNBs). A S1-MME interface/reference point is used for control signaling between the eNBs and the mobility management entity (MME). An eNB may have 51 links to multiple MMEs in case the MME pool concept is used. The user plane data goes via the Serving GateWay (SGW) on a S1-U interface/reference point. Between eNBs a X2 interface/reference point is used.

The MME (Mobility Management Entity) is responsible for idle mode UE (User Equipment) tracking and paging procedure including retransmissions; is involved in the bearer activation/deactivation process; and, is also responsible for choosing the SGW for a UE at the initial attach and at time of intra-LTE handover involving Core Network (CN) node relocation. The MME is also responsible for authenticating the user (by interacting with the HSS). The Non Access Stratum (NAS) signaling terminates at the MME and it is also responsible for generation and allocation of temporary identities to UEs. Among its other functions, the MME is the termination point in the network for ciphering/integrity protection for NAS signaling and handles the security key management.

The SGW (Serving Gateway) routes and forwards user data packets, while also acting as the mobility anchor for the user plane during inter-eNodeB handovers and as the anchor for mobility between LTE and other 3GPP technologies. For idle state UEs, the SGW terminates the downlink data path and triggers paging when downlink data arrives for the UE. The SGW manages and stores UE contexts, e.g. parameters of the IP bearer service and network internal routing information. The SGW also performs replication of the user traffic in case of lawful interception.

The PGW (PDN Gateway) provides connectivity from the UE to external packet data networks by being the point of exit and entry of traffic for the UE. The PGW performs policy enforcement, packet filtering for each user, charging support, lawful interception and packet screening.

An ePDG (Evolved Packet Data Gateway) essentially secures data transmission with a UE connected to the EPC over an untrusted non-3GPP access.

In general, in LTE the functions of a radio network controller (RNC) node are distributed between the radio base stations nodes (eNodeBs in LTE) and access gateways (AGWs), such as the SGW. As such, the radio access network (RAN) of an LTE system has an essentially "flat" architecture comprising radio base station nodes without reporting to radio network controller (RNC) nodes.

An issue with current use of LTE networks is that the traffic model has changed and now includes a significantly higher frequency of Service Request executions. Use of smart phones is a large contributor to this change.

A high frequency in Service Request executions cause a high load primarily to the SGW, but also to the MME as it is required to verify and provide bearer contexts to the eNodeB. The high signaling load at the SGW and possibly at the MME can lead to capacity bottlenecks, and reduce the operator's overall network performance. In extreme cases, this can also lead to network outages. This problem has caused network capacity limitations and operators are concerned.

The Radio Resource Control (RRC) sub-layer in 3GPP LTE performs control-plane functions such as broadcast of system information related to access stratum and non-access stratum, paging, establishment, maintenance and release of an RRC connection between the User Equipment (UE) and E-UTRAN, signaling radio bearer management, security handling, mobility management including UE measurement reporting and configuration, active mode handover, idle mode mobility control, Multimedia Broadcast Multicast Service (MBMS) notification services and radio bearer management for MBMS, Quality of Service (QoS) management and NAS direct message transfer between NAS and UE. A 3GPP LTE compliant UE has two steady-state operational states: RRC_CONNECTED and RRC_IDLE. A UE is in RRC_CONNECTED when an RRC connection or control-plane has been established. If this is not the case, i.e. no RRC connection is in place, the UE is in RRC_IDLE state.

In current procedures, a device is moved from connected state to idle state after a timeout of inactivity. Being in the idle state helps to reduce terminal battery consumption, as the terminals consume significantly less power in idle mode when their radio bearers have been released. It also helps reducing the load on the radio access network. However, moving a terminal from connected to idle mode, and then back from idle to connected, causes a lot of signaling, since the S1 release, service request and paging procedures in LTE incur a significant signaling overhead.

Since operators minimizing the time radio resources are used, and since the connected mode discontinuous reception (DRX) technology is not yet available, operators tend to configure a short inactivity time to quickly move terminals back to idle mode again. Even with connected mode DRX technology available, some operators may prefer to minimize the number of simultaneously RRC-connected mode terminals in an eNB, and therefore force a quick transition back to idle mode for terminals. However, depending on traffic pattern, a quick transition back to idle mode creates a problem with frequent connected-idle signaling resulting in a high signaling load.

SUMMARY

In one of its aspects the technology disclosed herein relates to a method performed by an evolved NodeB, eNB, which reduces signaling in a Core Network, CN, relating to state changes in a User Equipment, UE, said eNB having a Radio Resource Control, RRC, connection with the UE. The method comprises sending a request for a UE context release to a Mobile Management Entity, MME, in response to that the UE has been inactive during a predetermined time, receiving, from the MME, a command for a UE context release together with parameters for enabling local eNB paging of the UE, releasing the RRC connection, allocating a reduced context based on the received parameters and storing the reduced context in a memory of the eNB, retrieving the stored reduced context after receiving a downlink packet to the UE and paging the UE locally by means of the reduced context.

In various embodiments the retrieving of the reduced context is also made after receiving a service request from the UE in response to that the UE requests to return to a connected state and thereafter reconfiguring the RRC connection by means of the reduced context, such that the signaling is hidden from a Serving GateWay, SGW (10), of the CN.

In a first example embodiment the method further comprising starting a timer when storing the reduced context and upon timing out thereof releasing the stored reduced context or monitoring memory resources in the eNB and upon detection that a predetermined amount of the memory resources are occupied releasing the reduced context.

Furthermore, the reduced context may comprise a System architecture evolution Temporary Mobile Station Identity, S-TMSI, a International Mobile Subscriber Identity, IMSI mod 1024 and/or a UE specific Discontinuous Reception, DRX. The reduced context may also comprise bearer and security configuration parameters.

The reduced context may furthermore be a partial UE context enabling the reconfiguring of the RRC connection between the UE and the eNB, such that the signaling is hidden from the SGW. This embodiment further relates to allocating a key comprising a DownLink Internet Protocol address, DL IP@, and a Tunnel End point IDentifier, TEID on S1-U for identifying the partial UE context when a downlink package associated with the partial UE context arrives.

According to an alternative embodiment and mode the reduced context is a mini MME context enabling the eNB to handle a service request, such that the signaling is hidden both from the MME and the SGW.

According to one of its aspects, the technology disclosed herein concerns an evolved Node B, eNB, for reducing signaling in a Core Network, CN, relating to state changes in a User Equipment, UE. The eNB being configured to have Radio Resource Control, RRC, connections with the UEs and comprises a communications interface, via which, the eNB is connectable to the UE and a Mobile Management Entity, MME, a processor, and a computer readable medium storing computer program code which, when run in the processor, causes the eNB to send a request for a UE context release to a Mobile Management Entity, MME, in response to that the UE has been inactive during a predetermined time. Furthermore, the eNB is caused to receive, from the MME, a command for a UE context release together with parameters for enabling local eNB paging of the UE, release the RRC connection, allocate a reduced context based on the received parameters and storing the reduced context in a memory of the eNB, and retrieve the stored reduced context after receiving a downlink packet to the UE and page the UE locally by means of the reduced context.

In various embodiments the eNB is further caused to retrieve the reduced context after receiving a service request from the UE in response to that the UE requests to return to a connected state, and reconfigure the RRC connection by means of the reduced context, such that the signaling is hidden from a Serving GateWay, SGW, of CN.

Furthermore, the eNB may be caused to start a timer when the reduced context is stored and upon timing out thereof release the stored reduced context and/or to monitor memory resources in the eNB and upon detection that a predetermined amount of the memory resources are occupied release the reduced context.

Furthermore, the reduced context stored in the eNB may comprise a System architecture evolution Temporary Mobile Station Identity, S-TMSI, a International Mobile Subscriber Identity, IMSI mod 1024 and/or a UE specific Discontinuous Reception, DRX. The reduced context may also comprise bearer and security configuration parameters.

According to an alternative embodiment and mode the stored reduced context may be a partial UE reduced context enabling the reconfiguring of the RRC connection between the UE and the eNB, such that the signaling is hidden from the SGW. In this embodiment the eNB is further caused to allocate a key comprising a DownLink Internet Protocol address, DL IP@, and a Tunnel End point IDentifier, TEID on S1-U for identifying the partial UE context when a downlink package associated with the partial UE context arrives.

According to another alternative embodiment and mode the reduced context is a mini MME context enabling the eNB to handle a service request, such that the signaling is hidden both from the MME and the SGW.

Thus, according to various embodiments the connected-idle mode state changes are hidden from a core network node or entity. When such RRC state changes are hidden or concealed, the core network node/entity views the wireless terminal as being continuously connected to a base station (e.g., an eNB), even though the wireless terminal may make connected-idle transitions that are hidden (as long as the wireless terminal remains at a single base station).

In a first example embodiment changes to the idle state are hidden only to the serving gateway (SGW). In a second example embodiment changes to the idle state are hidden both from the serving gateway (SGW) and to the Mobility Management Entity (MME).

In one of its aspects, the technology disclosed herein concerns a base station node which comprises a communications interface to a wireless terminal; a communications interface to a Mobility Management Entity (MME); and a controller which operates in accordance with the first example main embodiment. The controller is configured, upon inactivity of the wireless terminal: (1) to send a UE context release request to the Mobility Management Entity (MME); (2) to receive from the MME parameters necessary for paging the wireless terminal; (3) to keep at least a partial UE context for the wireless terminal; and (4) to allocate a key to the kept UE partial context and to send the key to the Mobility Management Entity (MME). In an example embodiment and mode, the controller is further configured, upon receipt of a downlink packet received from a serving gateway (SGW) and destined to the wireless terminal: to obtain the at least partial UE context; to page the wireless terminal in a cell served by the base station using the paging parameters previously received from the Mobility Management Entity (MME).

In one of its aspects, the technology disclosed herein concerns a base station node which comprises a communications interface to a wireless terminal; a communications interface to a Mobility Management Entity (MME); and a controller which operates in accordance with the second example main embodiment. The controller is configured to obtain, from a Mobility Management Entity (MME), a portion of the UE context for the wireless terminal which becomes a mini-context for the wireless terminal; and, to use the mini-context involving the wireless terminal so that the base station need not notify the Mobility Management Entity (MME) of a change of RRC state of the wireless terminal. In an example embodiment and mode, the mini-context is sufficient to handle non-access stratum (NAS) functionality for a service request procedure involving the wireless terminal. In an example embodiment and mode, the mini-context comprises parameters necessary for paging the wireless terminal as well as at least part of a security context and at least part of a bearer context sufficient to re-establish the base station context after a service request.

In one of its aspects, the technology disclosed herein concerns a core network entity which comprises a communications interface to a base station and a controller which operates in accordance with the first example main embodiment. The controller is configured, upon receipt of a UE context release request received from a base station or due to inactivity of a wireless terminal served by the base station, to engage in one or more transactions involving the wireless terminal without notifying a serving gateway (SGW) of a change of RRC state of the wireless terminal. In an example embodiment and mode, the one or more transactions comprise a connected mode transaction. In an example embodiment and mode, the one or more transactions comprise at least one of: (1) processing a service request from the wireless terminal when the wireless terminal is in a cell served by the base station; (2) processing a service request from the wireless terminal when the wireless terminal has moved to a cell not served by the base station; (3) downloading of a packet from the serving gateway and through the base station to the wireless terminal when the wireless terminal is in the cell served by the base station; and (4) downloading of a packet from the serving gateway to the wireless terminal when the wireless terminal is in the cell not served by the base station.

In an example embodiment and mode, the controller is configured, upon receipt of the UE context release request received from the base station or due to inactivity of a wireless terminal served by the base station: (a) to refrain from notifying a serving gateway (SGW) of the UE context release request; (b) to receive from the base station a key to at least a partial UE context maintained by the base station; and (c) to provide the base station with parameters necessary for paging the wireless terminal.

In an example embodiment and mode, the controller is further configured, upon receipt of a service request for the wireless terminal: to generate an initial context setup request; to provide the key to the base station; and to refrain from notifying the serving gateway (SGW) of the service request.

In an example embodiment and mode, the controller is further configured, upon receipt of a service request for the wireless terminal after the wireless terminal has moved to a cell served by another base station: to generate an initial context setup request; to notify the serving gateway (SGW) of a new S1-U endpoint for the wireless terminal; and, to command the base station to release the at least partial UE context.

In one of its aspects, the technology disclosed herein concerns a core network entity which comprises a communications interface to a base station and a controller which operates in accordance with the second example main embodiment. The controller is configured to provide to the base station, and for a wireless terminal served by the base station, a portion of a UE context which becomes a mini-context for the wireless terminal so that the base station need not notify the core network entity of a change of RRC state of the wireless terminal. In an example embodiment and mode, the controller is further configured to store an identity of the base station where the mini-context is downloaded as well as to store the core network entity's own version of the UE context, and to upload the mini-context from the base station after the mini-context has been modified.

In addition to concerning the differing embodiments of base station nodes and core network entities/nodes, the technology disclosed herein also concerns wireless terminals and serving gateways (SGWs) which cooperate with or interact with the base station nodes and core network entities/nodes, as well as methods of operating a communication network comprising one or more of wireless terminals, nodes, or entities, and methods of operating or using the wireless terminal, nodes, and entities themselves.

With the technology disclosed herein it is possible to reduce the high load of signaling in the SGW due to a high frequency in Service Request executions caused by wireless terminals constantly changing from idle to connected mode. It is also possible to reduce signaling at the MME, which normally is required to verify and provide bearer contexts to the eNB.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2 is a diagrammatic view of portions of a communications network showing particularly nodes and entities involved in techniques for hiding RRC state changes (e.g., idle mode) from one or more nodes or entities of a core network.

FIG. 3A through FIG. 3E, FIG. 3F1 and FIG. 3F2, and FIG. 3G are signaling diagrams representing example, representative acts or steps comprising various signaling procedures or processes comprising a first example embodiment wherein idle state is hidden from a serving gateway (SGW).

FIG. 4A through FIG. 4C, FIG. 4D1 and FIG. 4D2, and FIG. 4E through FIG. 4H are signaling diagrams representing example, representative acts or steps comprising various signaling procedures or processes comprising a first example embodiment wherein idle state is hidden from both a serving gateway (SGW) and a Mobility Management Entity (MME).

DETAILED DESCRIPTION

Figure 1:
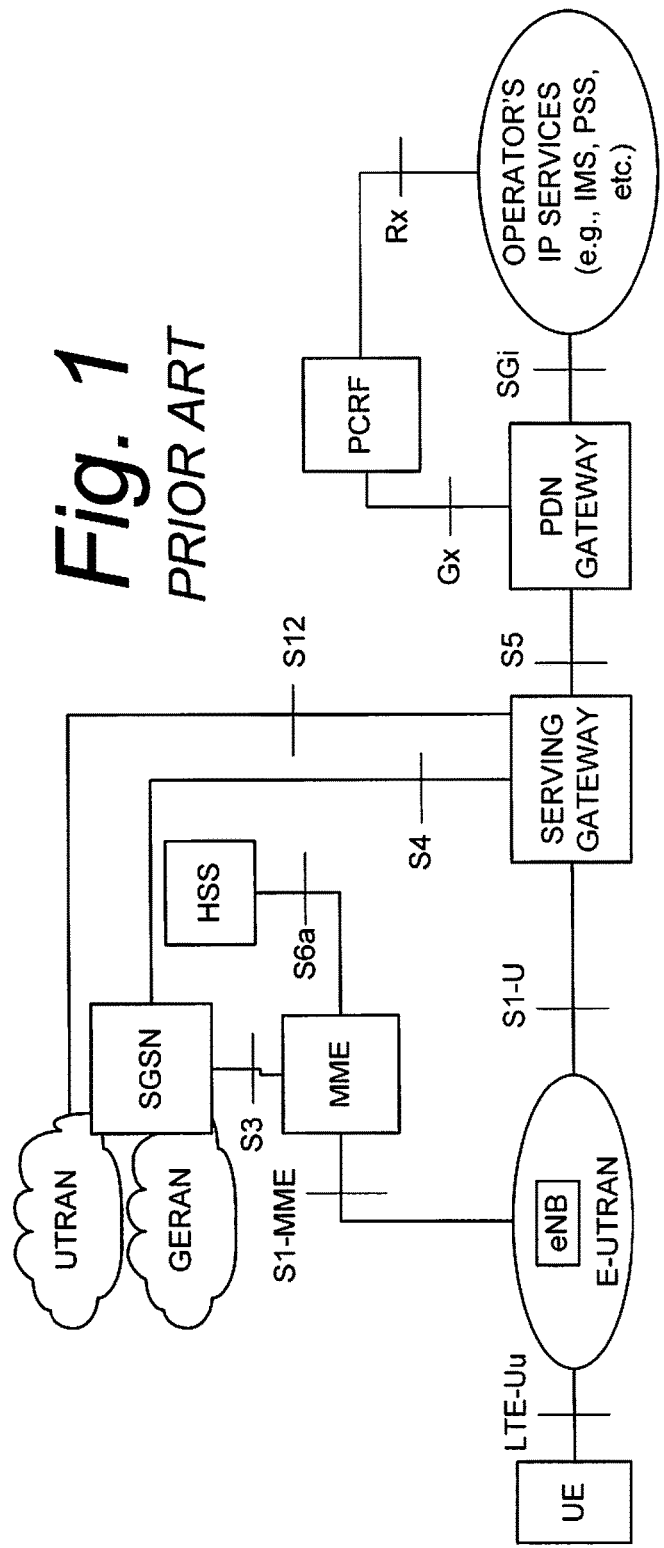
FIG. 1 is a diagrammatic view of architecture of a communications network suitable, e.g., for implementation of 3GPP LTE.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being eitherhardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As mentioned above, a quick transition back to idle mode creates a problem with frequent connected-idle signaling resulting in a high signaling load. In many cases, the terminal is stationary at a given eNB. The present inventors realized that if the eNB could itself handle the transitions between connected and idle mode, the signaling could be hidden from the core network (i.e., SGW and possibly from MME nodes). However, current signaling procedures do not make it possible to hide signaling from the core network. Accordingly, the technology disclosed herein hides connected-idle mode state changes from the SGW. That is, the SGW sees that the terminal is continuously connected to an eNB, even though the terminal makes connected-idle transitions that are hidden as long as the terminal remains at a single eNB.

There are two main embodiments of the technology disclosed herein: a first example embodiment in which changes to the idle state are hidden only to the serving gateway (SGW); and (2) a second example embodiment in which changes to the idle state are hidden both from the serving gateway (SGW) and to the Mobility Management Entity (MME). Normally, when the eNB and other entities in an e-UTRAN are performing signaling relating to state changes of the UE, the eNB and the other entities use context comprising parameters and other information relating to paging, security etc. to be able to carry out the signaling. The common feature for both the main embodiments is that a portion of that context, i.e. a reduced context is stored and later used for reducing (hiding) signaling at the SGW and the MME. Both the SGW and the MME belong to the Core Network, CN, and thus in both embodiments the signaling is reduced in the CN.

Hiding the idle state changes from the serving gateway (SGW) only and exposing it to the MME is significantly less complex. Yet in some situations the MME would also benefit from a reduced signaling load in this case (e.g. no Downlink Data Notification or paging). On the other hand, hiding the state changes from the MME in addition to the SGW brings significantly higher signaling load reduction at the MME. FIG. 2 shows portions of a communications network, and particularly shows nodes and entities involved in the two main example embodiments introduced above, e.g., node and entities suitable for implementing techniques for hiding RRC state changes from one or more nodes or entities of a core network. FIG. 2 shows a base station 2 (BS) [in the form of an eNodeB or eNB] connected over an air or radio interface to a wireless terminal or UE 4. The base station 2 (BS) is connected over interface S1-U to a serving gateway 10 (SGW), and over interface S1-MME to a Mobility Management Entity 6 (MME).

The base station (BS) comprises a communications interface IF which facilitates radio communications over the air interface on both the uplink (UL) and the downlink (DL) with the wireless terminal 4, as well as another interface IF toward the Mobility Management Entity 6 (MME). The base station 2 (BS) further comprises a radio resource control (RRC) entity; UE context manager; paging unit; service setup/request unit; and, a base station controller or processor 12 ("state change concealment controller") which participates in the process of hiding or concealing the RRC state changes from one or more nodes or entities of the core network. The controller or processor may also comprise a timer for determining how long the reduced context has been stored in the base station. The base station comprises a memory 8 for storing the reduced context as will be described below.

The wireless terminal 4 also comprises a communications interface which facilitates radio communications over the air interface on both the uplink (UL) and the downlink (DL) with the wireless terminal. The wireless terminal 4 further comprises a radio resource control (RRC) entity; a service setup/request unit; and, a wireless terminal controller ("state change concealment controller") which participates in the process of hiding or concealing the RRC state changes from one or more nodes or entities of the core network.

The Mobility Management Entity 6 (MME) comprises an access bearer manager; a UE context manager; and a MIME controller ("state change concealment controller") which participates in the process of hiding or concealing the RRC state changes from one or more nodes or entities of the core network. As further shown in FIG. 2, the serving gateway 10 (SGW) comprises an access bearer manager and a downlink packet manager.

The foregoing functionalities are involved either or both of the examplary main embodiments described herein, and may be particularly involved in one or more acts of various procedures or processes of those example embodiments as described below.

1.0 Hiding Idle State from SGW but not from MME

In a first example embodiment and mode, the state changes are hidden from the SGW, while they are exposed to (e.g., not hidden from) the MME. The MME downloads some additional parameters, i.e. a reduced context, to the eNB to enable the local paging of the terminal. The eNB keeps such parameters in the reduced context, also called a partial context, even while the terminal is idle. The eNB may keep such a partial context as long as the UE resides in the eNB, or until a timeout, or until the eNB for other reasons decides to release the context, e.g., due to lack of memory resources in the eNB. When the partial context is released may depend on subscription/terminal characteristics (e.g. stationary or not stationary), collected traffic statistics for the terminal, or operator policies. FIG. 3A-FIG. 3G illustrate various example signaling procedures and how they are updated for the first example embodiment.

1.1 S1 Release

Figure 3A:
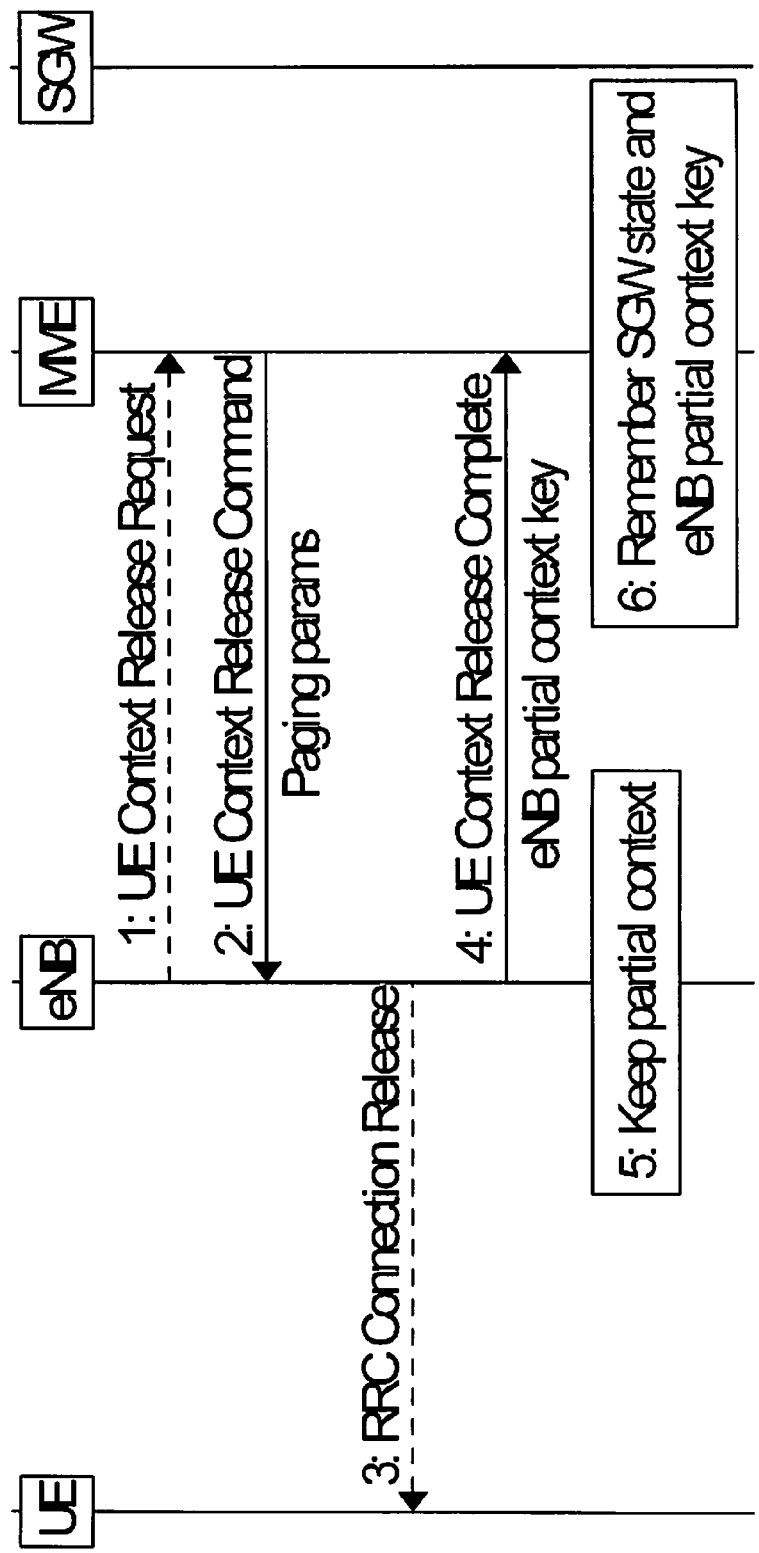

FIG. 3A illustrates a S1 Release signaling procedure according to an example embodiment and mode. Acts included in FIG. 3A include the following:

Act 3A-1: The S1 release is typically triggered by user inactivity, causing UE context release request signaling to MME. As opposed to standard S1 release procedure, MME does not notify SGW.

Act 3A-2: In addition to the UE context release command, the MME also includes parameters that are necessary for the eNB to locally page the terminal when necessary. This includes the S-TMSI, IMSI mod 1024 (which is necessary for calculating the paging occasions), and the UE specific DRX if present. In case any change occurs in these parameters later on, the MME may either signal the change, or stop the hiding of idle mode.

Act 3A-3: The RRC connection is released as per current procedure.

Act 3A-4: The eNB confirms the release to the MME, and the eNB also allocates a key to its partial context that it keeps (see act 5 below), and includes it in the response message to MME. That key should be unique among all eNBs. Such a key could be the DL IP@ and TEID on S1-U. As used herein, the expression "DL IP@" refers to a downlink Internet Protocol address. Even if another key is used, the eNB has to be able to use the DL IP@ and TEID locally to look up the partial context, so that the context can be identified when a downlink packet arrives.

Act 3A-5: The eNB keeps the reduced or part of the UE context which includes at least the DL IP@ and TEID information that it uses on the S1-U user plane and the paging parameters received in act 2. The eNB may keep additional parameters such as bearer and security configuration parameters to make it quicker to re-establish connectivity when necessary. Some radio parameters such as link adaptation parameters may also be kept for increased radio efficiency. The eNB may also store the cell where the terminal was last connected in case of multiple cells per eNB to be used for more efficient paging. The partial UE context might be kept on a lower cost memory resource in the eNB.

It must also be possible to distinguish partial UE contexts from normal connected mode UE contexts, for example for eNB licensing purposes, Act 3A-6: MME remembers that SGW's view that UE is connected at eNB, and the MME also stores the eNB partial context key.

1.2 Release of Partial Context after Timeout

Figure 3B:
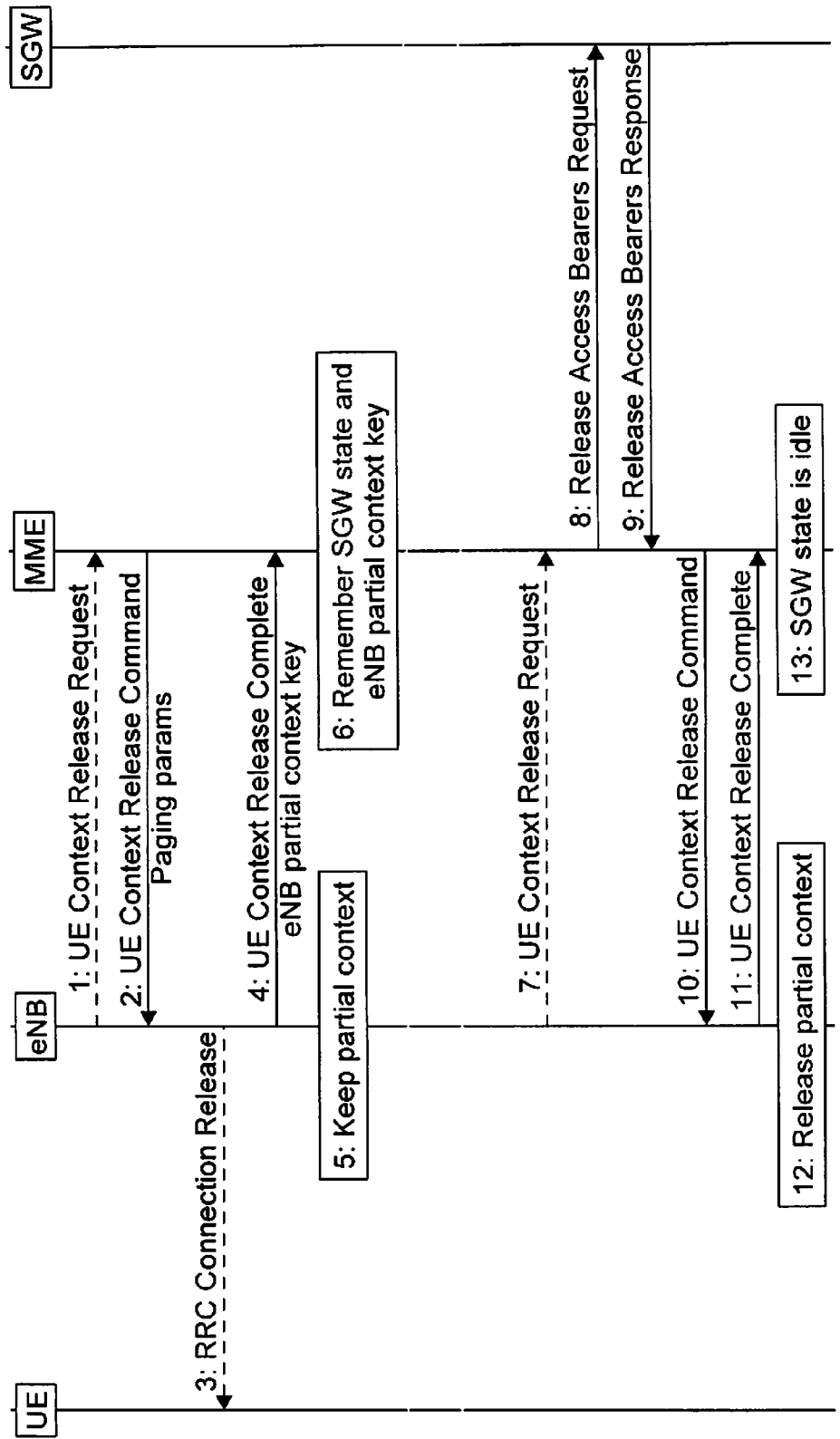

FIG. 3B illustrates a release of partial context after timeout procedure according to an example embodiment and mode. For that purpose a timer is started when storing the reduced or partial context. After a configurable timeout period it is proposed that the partial context stored in the eNB is released. This helps to reduce the additional context storage requirements in the eNB, and also reduces the probability that the terminal may move from the eNB while its context is stored there, in which case the handling is less efficient, as shown later below. Acts included in FIG. 3B include the following:

Act 3A-1 through Act 3A-6: The partial context is set up in the eNB as described earlier in relation to FIG. 3A.

Act 3B-7: After a configurable timer has expired, the eNB initiates the release of the partial context by sending a UE context release request to the MME.

Act 3B-8-Act 3B-11: The S1 release procedure continues as standardized, which also includes the notification of the SGW.

Act 3B-12: The partial context is released in the eNB.

Act 3B-13: The MME also releases the information related to the partial context in the eNB, i.e. the MME also considers the SGW state to be idle.

1.3 Serving Request from a Status UE (Same eNB)

Figure 3C:
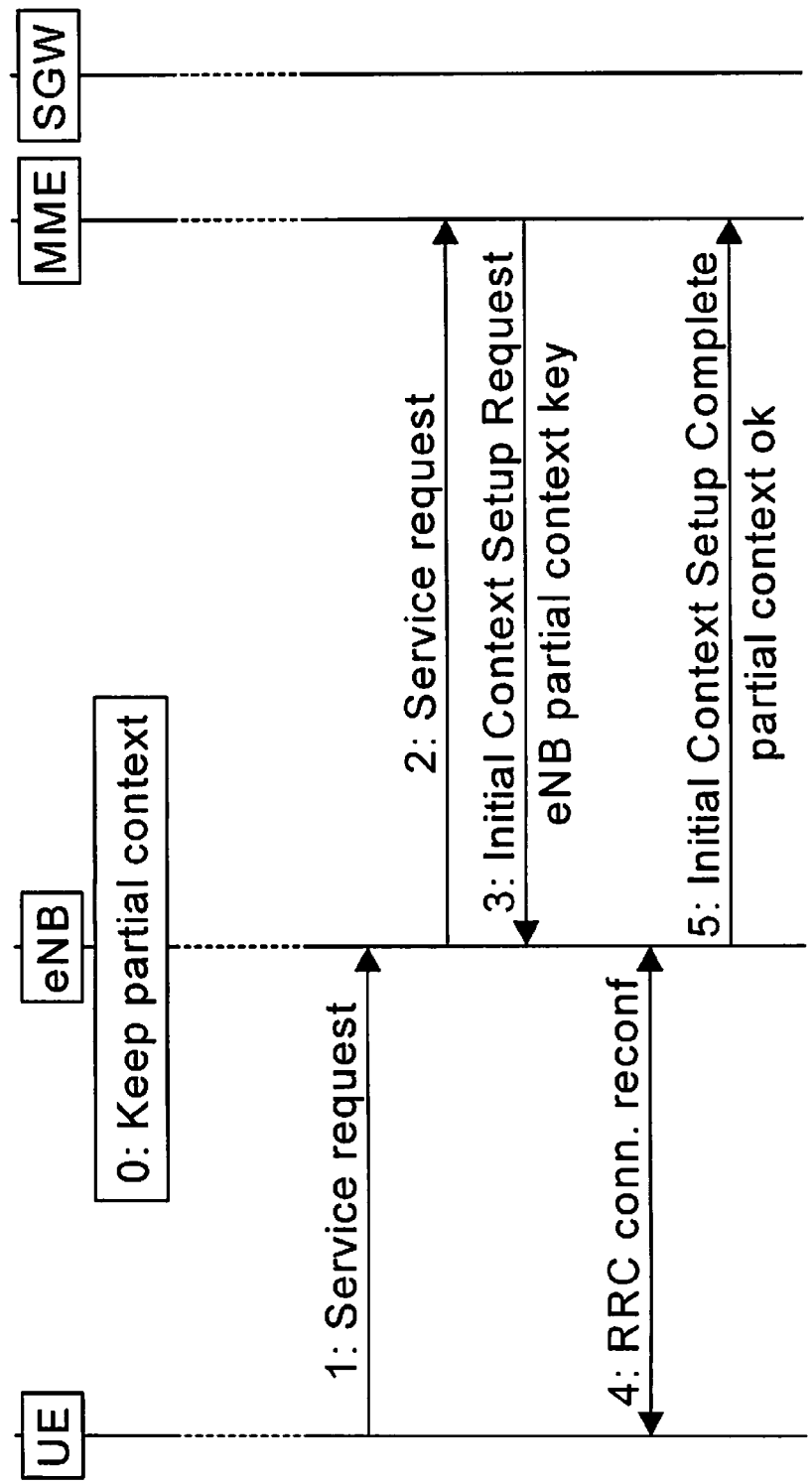

FIG. 3C illustrates a serving request from a status UE (same eNB) according to an example embodiment and mode. Acts included in FIG. 3C include the following:

Act 3C-0: The eNB keeps a partial context as described earlier.

Act 3C-1 and Act 3C-2: Terminal sends Service request, which is forwarded to MME as per current standard procedures Act 3C-3: MME determines that the SGW is still kept connected. The MME responds with an Initial Context Setup Request as in current procedure, but also adds the eNB partial context key. That key is used to look up the stored reduced or partial context, so that the eNB can use the same parameters, i.e. the same DL IP@ and TED, for the user.

Act 3C-4: The security and bearer setup takes place as per current procedures.

Act 3C-5: The setup of the context is acknowledged as per current procedures. The use of the partial context is also acknowledged.

During the just-described procedure, the MME is aware that the SGW does not need to be notified since S1-U remains unchanged from the SGW point of view, hence MME-SGW signaling is avoided. The MIME awareness can be based on the partial context usage acknowledgement in act 5, or based on the MME's context which stores that the SGW has the terminal in connected mode.

Alternatively, the message Initial Context Setup Request can be replaced by a new and simplified message, here named UE Context Accepted. If the eNB stores in its partial context all the information that is included in the Initial Context Setup Request parameters, then these parameters do not need to be provided and a less complex message UE Context Accepted may be used. In that case, it could be possible to skip act 5.

1.4 Downlink Data in Idle Mode to Static (Same eNB)

Figure 3D:
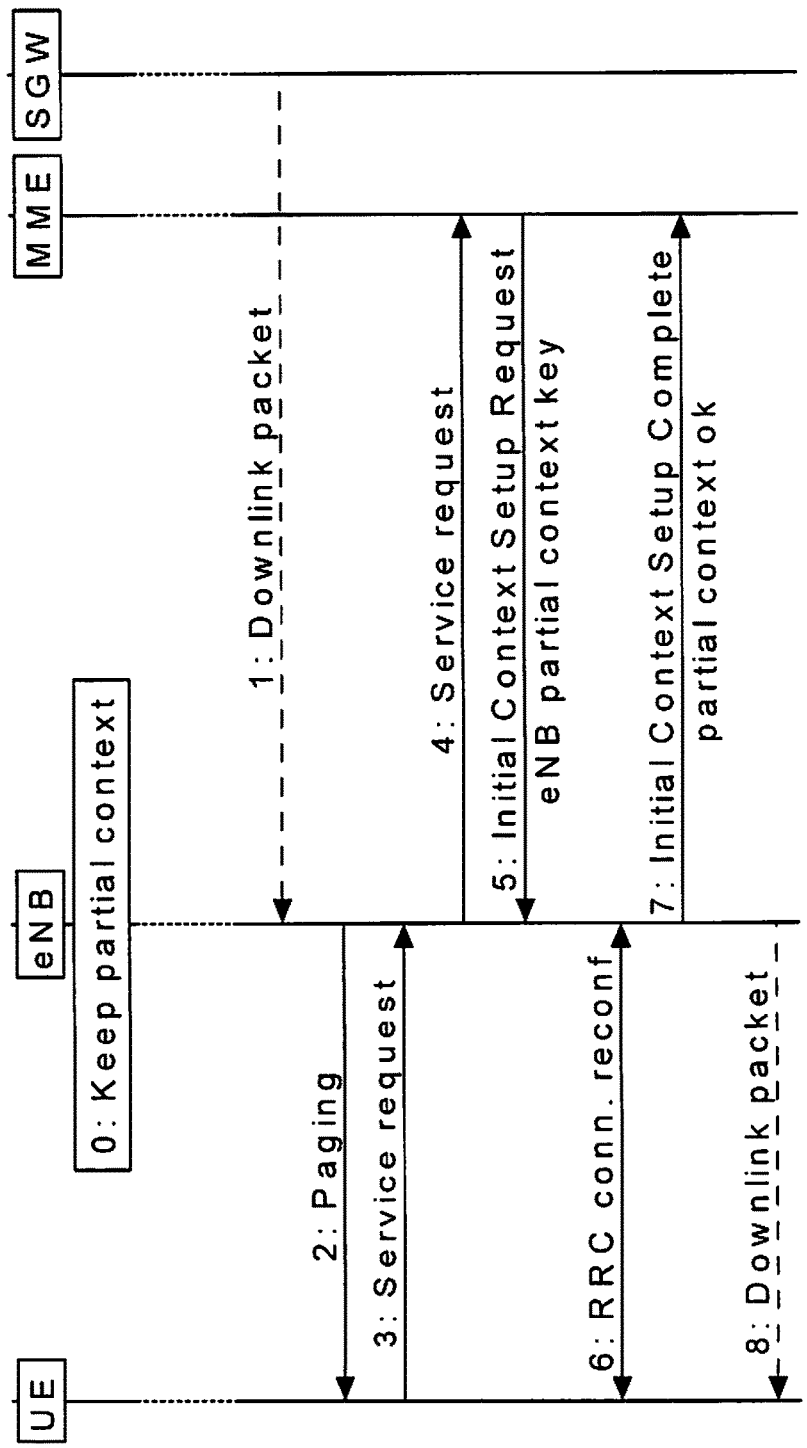

FIG. 3D illustrates downlink data in idle mode to static (same eNB) according to an example embodiment and mode. Acts included in FIG. 3D include the following:

Act 3D-0: The eNB keeps a partial context as described earlier.

Act 3D-1: SGW forwards downlink packet to eNB, as in connected mode. The eNB buffers the downlink packet and looks up the partial context corresponding to the given S1-U bearer.

Act 3D-2: eNB locally pages the terminal in its cells using the paging parameters that it stores in the partial context. It may be possible for the eNB to remember the last cell where the terminal was connected and start paging at that cell first.

Act 3D-3 through Act 3D7: In response to receiving the paging, the terminal proceeds with the Service request procedure similar to how it is described above.

Act 3D-8: The downlink packet is then delivered to the terminal.

As for the service request procedure, the MME is aware that the SGW does not need to be notified since S1-U remains unchanged from the SGW point of view, hence MME-SGW signaling is avoided. The MME awareness can be based on the partial context usage acknowledgement in act 5, or based on the MME's context which stores that the SGW regards the terminal connected.

1.5 Service Request when UE has Moved

Figure 3E:
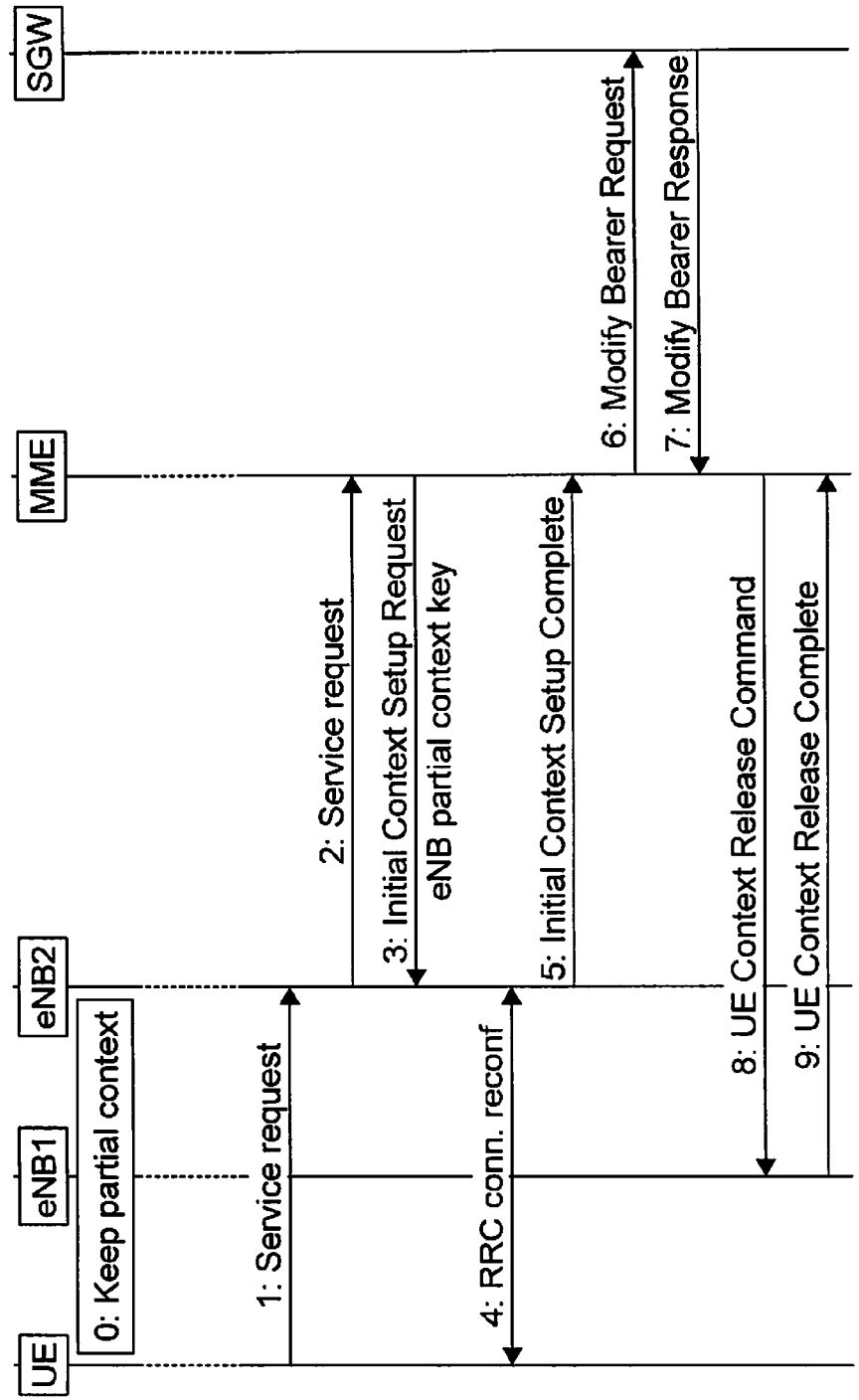

FIG. 3E illustrates a service request when UE has moved according to an example embodiment and mode. Acts included in FIG. 3E include the following:

Act 3E-0: The eNB keeps a partial context as described earlier.

Act 3E-0 through Act 3E-2: Terminal moves in idle mode from eNB1 to eNB2 and sends Service request, which is forwarded to MME as per current standard procedures.

Act 3E-3: The MME responds with an Initial Context Setup Request as in current procedure. The MME may also add the eNB partial context key since the MME is aware that the SGW considers the terminal connected; however the MME may determine that the UE has moved and skip adding that parameter, e.g., it is irrelevant whether the eNB partial context key is added or not by the MME.

Act 3E-4: The security and bearer setup takes place as per current procedures. Note that there is no partial context stored in eNB2, so no partial context is used.

Act 3E-5: The setup of the context is acknowledged as per current procedures. However, the use of the partial context is not acknowledged.

Act 3E-6 through Act 3E-7: The SGW is notified of the new S1-U endpoint. From the SGW point of view, this appears as a handover. The MME determines that the SGW needs to be notified and acts 8-9 below need to be executed based on the lack of the partial context usage acknowledgement in act 5, or based on determining that the terminal has moved from eNB1 to eNB2.

Act 3E-8 through Act 3E-9: The MME commands eNB1 to release the partial context. The UE context release command/complete messages, or a new message can be used for this purpose. The MME also releases the information in the UE context about the partial context being stored in eNB1.

Alternatively, it is possible to skip messages 8-9, and let the partial context in eNB1 time out, after which eNB1 requests the MME to release the context. In that case, the MME removes the partial context in eNB1, but if the terminal is connected at another eNB it does not move the terminal to idle mode.

1.6 Downlink Data in Idle Mode when UE has Moved

When downlink data arrives in idle mode, the SGW forwards it to the original eNB where it considers the terminal to be connected. This is the intended behaviour for terminals that are mostly static, but this causes extra complexity if the terminal is eventually not found at the given eNB.

There can be a few ways how this issue can be mitigated:
Timer based release of the eNB partial context as shown earlier helps to reduce the time when this situation can occur.

It is possible to configure shorter periodic tracking area update (TAU) timers to more quickly detect when the UE has moved away. When the MME detects that the terminal performs a TAU procedure from another eNB than the one where it became idle, it can release the partial eNB context and the terminal becomes idle, so that downlink packets generate a regular paging process.

It is possible to configure a small Tracking Area (TA) (optimal: single eNB only) and single TA in TA list to quickly detect when the terminal moves away and then release the terminal to idle mode as in the previous bullet.

While the measures above may decrease the extent of the issue, it may still occur, and if there is no explicit handling of the situation it would lead to undesirable packet losses. It may be possible to accept a certain level of packet loss, but it is preferable to avoid this. Hence the following includes two example alternatives to handle the situation of a downlink packet which arrives to an eNB in case the UE has already moved to another eNB.

1.6.1 Alternative 1a: Packet Forwarding Between eNBs 1.6.1.1 Alternative 1a: Packet Forwarding Between eNBs Using IP Connectivity FIG. 3F1 illustrates downlink data in idle mode when UE has moved in an implementation in which packet forwarding occurs between eNBs using IP connectivity. In this alternative, the downlink packet is buffered in the old eNB1, which requests the MME to perform paging. Once the terminal is connected, the buffered packet is forwarded to the new eNB2. This does not impact the SGW, but requires new procedure for the eNB to trigger the paging, and also a way for the MME to set up packet forwarding. Example acts included in FIG. 3F1 include the following:

Act 3F 1-0: The Partial Context is Initially Set Up in eNB1.

Act 3F1-1: A downlink packet is sent from the SGW to eNB1, when the terminal has already moved to eNB2.

Act 3F1-2: eNB1 tries to page the terminal using the information in its partial context.

Act 3F1-3: The paging fails as the terminal has already moved away from eNB1. Paging failure may be detected by timer supervision of the eNodeB.

Act 3F1-4: The paging failure is indicated to the MME in a new message. This is a request to the MME to perform the regular paging in all the TAs of the terminal's TAI list.

Act 3F1-5: MME sends paging message to relevant eNBs,
Act 3F1-6: Terminal receives the paging in eNB2.

Act 3F1-7 through Act 3F1-11: The terminal performs a regular service request procedure. In Act 3F1-9 the MME may also add the eNB partial context key allocated by eNB1 to the initial context setup request message sent to eNB2 since the MME is aware that the SGW considers the terminal connected; however the MME may determine that the UE has moved and skip adding that parameter. I.e., it is irrelevant whether the eNB partial context key for eNB1 is added or not by the MME. In any case, the eNB2 partial context key usage is provided to MME at Act 3F1-11, initial context setup complete.

Act 3F1-12: In a new type of message, the MME sets up packet forwarding from eNB1 to eNB2. In this data forwarding request message, the MME includes the eNB1 partial context key so that eNB1 can identify which buffered packets to forward. The MME also includes the IP@ and TED at eNB2 to send the packets to, which is the same GTP-U tunnel endpoint as the one used for S1-U, which the MME becomes aware of in act 11. Packet forwarding is possible as long as data connectivity is properly provisioned, also when X2 connectivity is not set up, so X2 connectivity is an aspect that might not be considered by the MME.

Act 3F1-13: The previous act is acknowledged.

Act 3F1-14: Buffered packets are now forwarded from eNB1 to eNB2, which are then delivered to the terminal.

Act 3F1-15 through Act 3F1-16: The SGW is notified so that the downlink data path is switched from eNB1 to eNB2. From the SGW's point of view this appears as a handover. The MME can be aware of the need to notify the SGW based on the lack of the eNB partial context usage acknowledgement in act 11.

Act 3F1-17: Downlink packets are now routed directly from the SGW to eNB2.

Act 3F1-18 through Act 3F1-19: The partial context in eNB1 is now released by the MME.

Alternatively it may be possible to execute Act 3F1-18 through Act 3F1-19 in the place of Act 3F1-12 through Act 3F1-13, with extra parameters indicating packet forwarding. That would result in eNB1 freeing up the context, but still keeping the packet forwarding state for a period of time while there are packets to be sent, and then release the full context afterwards.

As another option, it could be possible to perform packet forwarding via the MME, such that the buffered packet is sent to MME in Act 3F1-4, and appended to the signaling message in Act 3F1-9. This avoids the need to set up direct packet forwarding so that Act 3F1-12 through Act 3F1-13 can be eliminated, but on the negative side Act 3F1-4 and Act 3F1-9 become more complex. Also, this helps only the initial packet to be forwarded, but would require extra complexity to forward additional downlink packets that may arrive further on.

1.6.1.2 Alternative 1b: Packet forwarding between eNBs set up over X2

FIG. 3F2 illustrates downlink data in idle mode when UE has moved in an implementation in which packet forwarding occurs between eNBs set up over X2. This second alternative is similar to the first alternative described above, with the difference that packet forwarding is set up by an explicit X2 message exchange between eNB1 and eNB2. Example acts included in FIG. 3F2 include the following:

Act 3F2-0 through Act 3F2-9: These acts are performed as in the first alternative above.

Act 3F2-10: In a new type of message, the MME requests packet forwarding from eNB1 to eNB2. In this data forwarding request message, the MME includes the eNB1 partial context key so that eNB1 can identify which buffered packets to forward, and the eNB2 identity so that eNB1 can use the X2 interface to eNB2 for data forwarding. The MME will restrict this act to only the cases when X2 connectivity is set up between eNB1 and eNB2.

Act 3F2-11: eNB1 sends a new X2 message to request data forwarding to eNB2 and the message includes the eNB1 partial context key.

Act 3F2-12: eNB2 accepts the X2 data forwarding request and identifies that the eNB1 partial context key is associated with the eNB2 UE context that is established between eNB2 and MME by acts 8 and 9. eNB2 acknowledges accepted data forwarding by a new X2 response including the IP@ and TEIDs to use for data forwarding over the X2 interface.

Act 3F2-13: eNB1 informs MME about accepted data forwarding.

Act 3F2-14: Buffered packets are now forwarded from eNB1 to eNB2 over the X2 interface, which are then delivered to the terminal.

Act 3F2-15 through Act 3F2-21: Act 3F2-15 through Act 3F2-21 are performed as the corresponding acts in alternative 1a. Note that these acts may be performed in parallel to Act 3F2-10 through Act 3F2-14.

Alternatively it may be possible to execute Act 3F2-20 through Act 3F2-21 in the place of Act 3F2-10 through Act 3F2-13, with extra parameters indicating packet forwarding. That would result in eNB1 freeing up the context, but still keeping the packet forwarding state for a period of time while there are packets to be sent, and then release the full context afterwards.

1.6.2 Alternative 2: Send Packet via SGW using GTP error indication

Figure 3G:
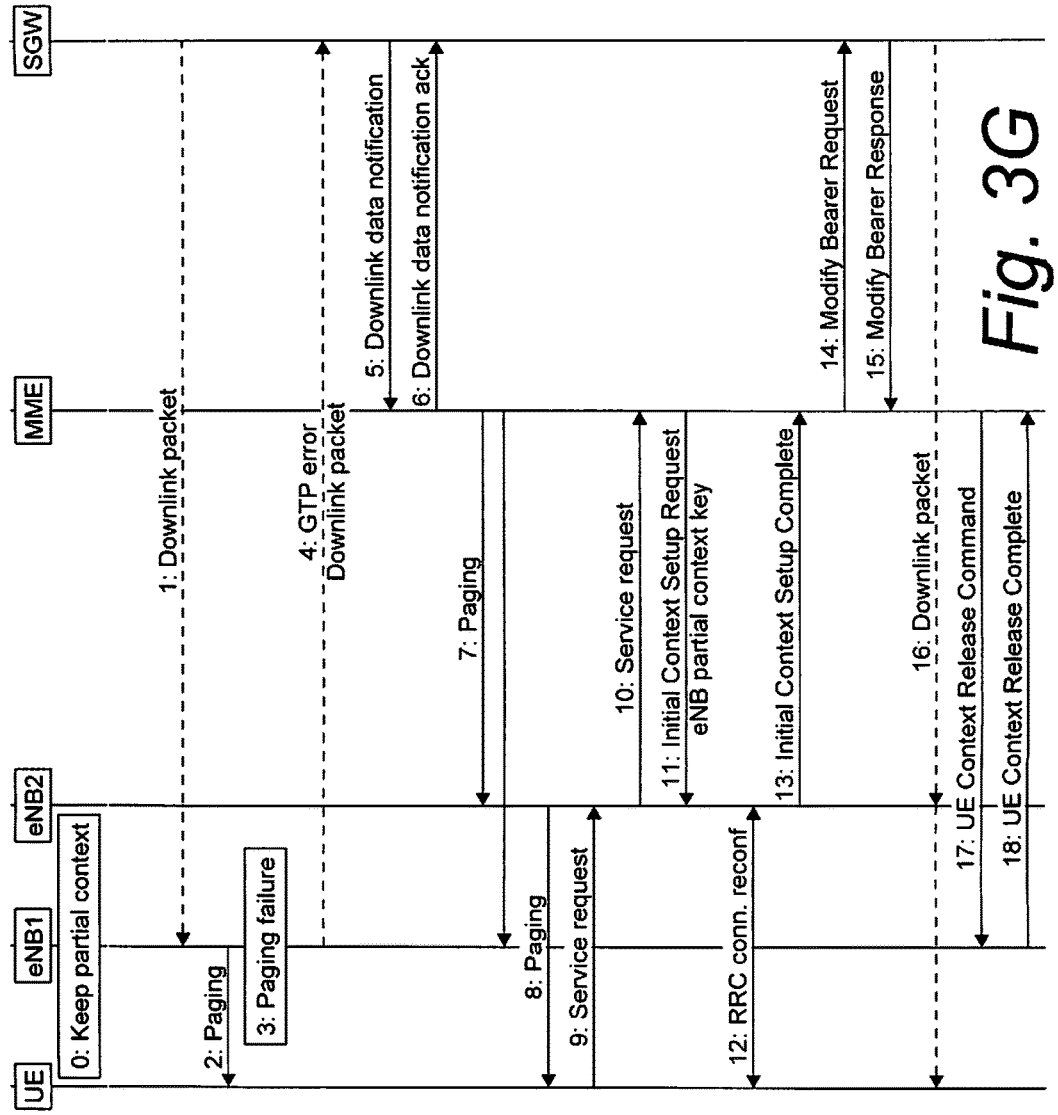

In this alternative, illustrated in FIG. 3G, the downlink packet is returned to the SGW in a GTP error message, which then triggers a regular paging procedure. This reduces procedural impact, but it requires special processing in the eNB and SGW which might not be available. Example acts included in FIG. 3G include the following:

Act 3G-0: The partial context is initially set up in eNB1.

Act 3G-1: A downlink packet is sent from the SGW to eNB1, when the terminal has already moved to eNB2.

Act 3G-2: eNB1 tries to page the terminal using the information in its partial context.

Act 3G-3: The paging fails as the terminal has already moved away from eNB1.

Act 3G-4: eNB2 generates a new type of GTP error message, and includes also the packet in that message, and the SGW buffers the packet. (It can be possible to skip the packet as well, leading to a packet drop which is of course less desirable.)

Act 3G-5 through Act 3G-16: In response to the GTP error message, the SGW proceeds with paging as per current standard, which results in the MME paging the terminal, and the terminal responding with Service request. The SGW is informed of the new eNB in Act 3G-14 and Act 3G-15.

Act 3G-17 through Act 3G-18: The MME releases the partial context in eNB1.

2.0 Hiding Idle State from Both SGW and MME

In a second example embodiment and mode, state changes between idle mode and connected mode are hidden from both the MME and the SGW during an extended user inactivity timeout by moving part of the reduced context (MME context) called MME mini-context here, sufficient to handle NAS functionality for the Service Request procedure, from MME to eNodeB. This brings more complexity to the eNB, but the signalling load on the MME is decreased. FIG. 4A-4H illustrate various example signaling procedures and how they are updated for the second example embodiment.

2.1 Basic Flow

Figure 4A:
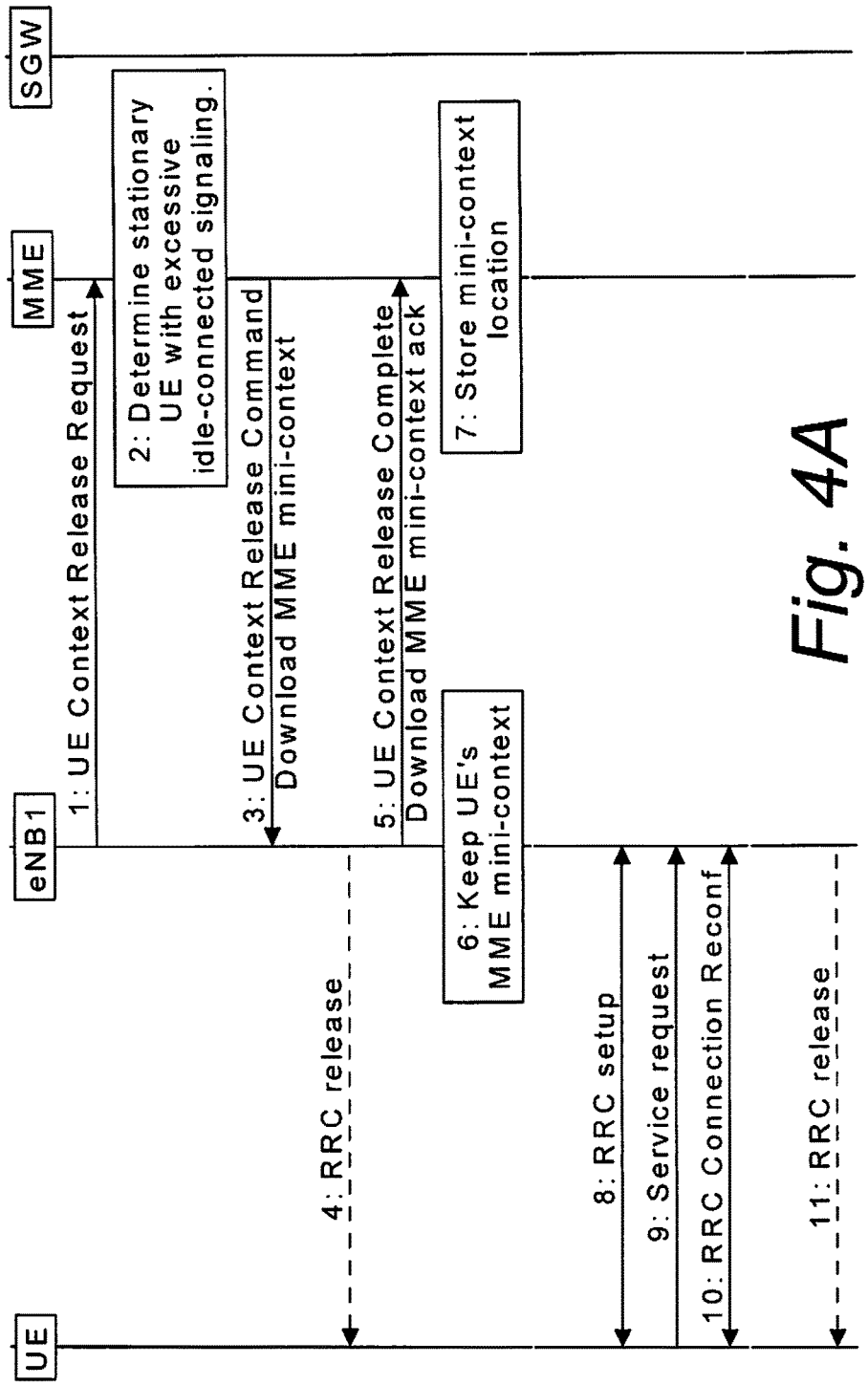

FIG. 4A illustrates the S1 release procedure as the terminal is moved to idle mode, and a subsequent service request. Example acts included in FIG. 4A include the following:

Act 4A-1: After a period of inactivity, eNB initiates the transition of the UE to idle mode by sending UE context release request to the MME.

Act 4A-2: MME determines whether to apply signaling optimization. This can be based on past signaling history or subscription information. The optimization is most applicable to terminals with low mobility (static terminals) which have a high rate of connected/idle transitions.

Act 4A-3: If the MME has decided to apply the optimization, the MME mini/context is downloaded to eNB1 in this act.

Act 4A-4: The RRC connection is released according to standard procedures.

Act 4A-5: eNB1 acknowledges the release of the UE context as well as the download of the MME mini-context.

Act 4A-6: eNB keeps the UE's MME mini-context. That context includes a part of the security context and also a part of the bearer context, sufficient to re-establish the eNB context after a service request. The context also include parameters necessary for paging the terminal, i.e. the IMSI, S-TMSI and a UE specific DRX when it exists. The context can be identified by the GUTI.

Act 4A-7: MME stores the identity of the eNB where the MME mini-context is downloaded. This allows the MME to know that there is another, more up-to-date version of the context. If there is any modification necessary in the MME's context, it will be necessary to first upload the MME mini-context again to the MME.

Act 4A-8: After a period of time, the terminal needs to perform the service request procedure, and as a prerequisite it first sets up RRC connectivity.

Act 4A-9: Terminal sends service request.

Act 4A-10: Based on the MME mini-context eNB1 can determine that the terminal is performing service request which is addressed to the terminal with the given MME mini-context, and set up the necessary eNB security and bearer contexts. This serves as an acknowledgement to the UE for the service request.

Act 4A-11: After a period of inactivity, the terminal is released to idle mode. For this, it is sufficient to release the RRC connection, and there is no need to signal to the core network. Hence, signaling load is decreased.

2.2 Downlink Packet, Status UE (Same eNB)

Figure 4B:
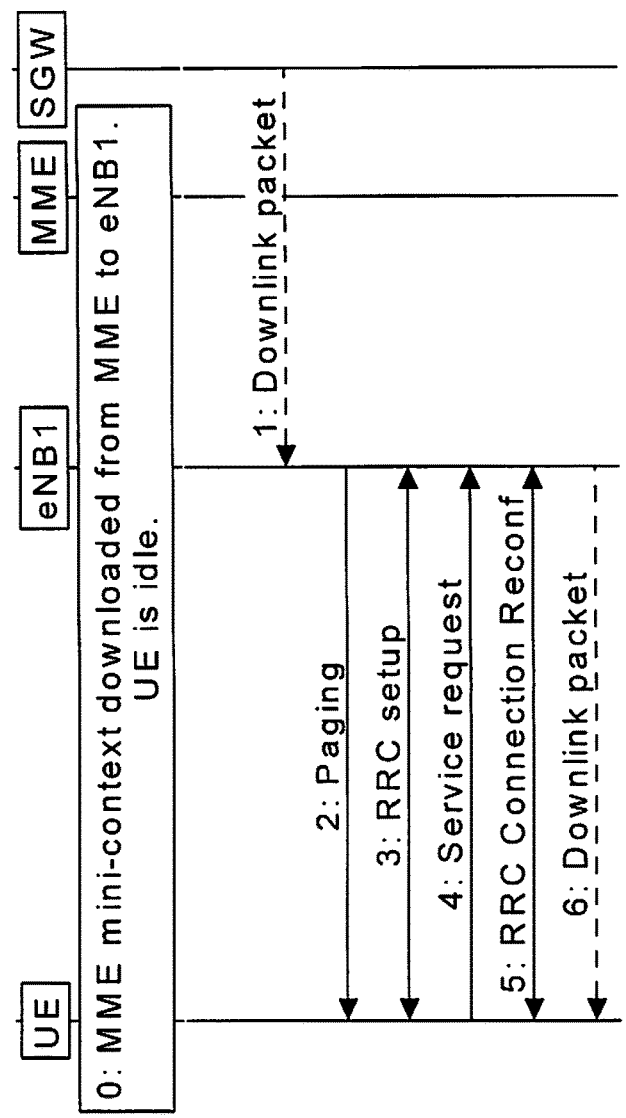

FIG. 4B illustrates the process for a downlink packet in the typical case when the terminal stays at the same eNB. Example acts included in FIG. 4B include the following:

Act 4B-0: The process starts with the MME mini-context downloaded from MME to eNB, when the UE is idle.

Act 4B-1: The downlink packet is sent from the SGW to eNB1, as the SGW considers the terminal connected at eNB1.

Act 4B-2: Using the parameters stored in the eNB MME mini-context, eNB1 pages the terminal.

Act 4B-3: The terminal responds to the paging and the RRC connection is set up using regular procedures.

Act 4B-4: Terminal sends service request, which the eNB1 can handle using the security and bearer context stored in the MME mini-context.

Act 4B-5: The security and bearer configuration is set up, which also serves as an acknowledgement to the service request.

Act 4B-6: Downlink packet is delivered to the terminal.

2.3 Service Request from Another eNB

Figure 4C:
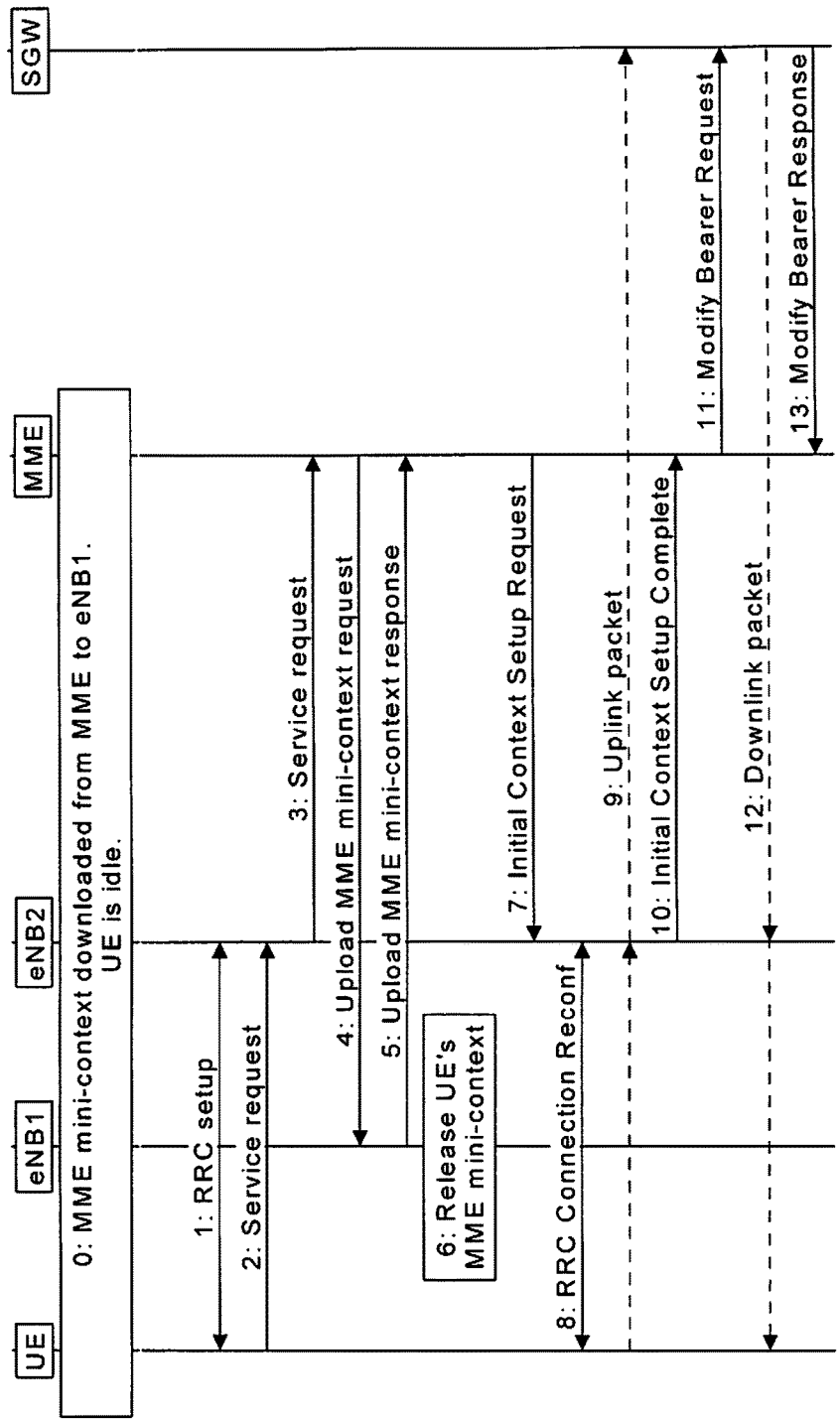

FIG. 4C illustrates a situation in which a terminal that has moved away to another eNB is sending a Service request. Example acts included in FIG. 4C include the following:

Act 4C-0: The process starts with that the MME mini-context is downloaded from MME to eNB, when the UE is idle.

Act 4C-1: After a period of time, the terminal needs to perform the service request procedure, and as a prerequisite it first sets up RRC connectivity.

Act 4C-2: Terminal sends service request to eNB2, which is different from where its MME mini-context is stored is eNB1.

Act 4C-3: Since the Service request cannot be answered in eNB2, it is forwarded to the MME.

Act 4C-4: The MME realizes that the terminal has moved to another eNB, and hence it requests that the MME mini-context is uploaded so that it is no longer used in eNB1. The uploading of the MME mini-context is also needed to authenticate the NAS service request received in the previous act.

Act 4C-5: Uploading of the MME mini-context takes place. It can be possible to upload only the changes in the context.

Act 4C-6: The MME mini-context can now be released from eNB1.

Act 4C-7 through Act 4C-13: The rest of the service request takes place according to standard procedures. From the SGW point of view this appears as a handover since the terminal was earlier considered connected at eNB1.

This procedure requires the MME to perform additional processing, i.e., fetching the UE context which contains the most recent security context, before the Service request message is authenticated.

2.4 Downlink Packet, UE has Moved

FIG. 4D1 shows a terminal that has moved away to another eNB and gets a downlink packet. As compared to section 1.6 hereof (which also concerns downlink data in idle mode when UE has moved), which has two alternatives, only the first alternative is presented here, because the uploading of the MME mini-context requires eNB1-MME signaling which favors the first alternative situation in which a terminal that has moved away to another eNB is sending a Service request. The measures described in Section 1.6 for reducing the extent of this case apply here as well. Example acts included in FIG. 4D1 include the following:

Act 4D1-0: The process starts with the MME mini-context downloaded from MME to eNB, when the UE is idle.

Act 4D1-1: The downlink packet is sent from the SGW to eNB1, as the SGW considers the terminal connected to eNB1.

Act 4D1-2: Using the parameters stored in the eNB MME mini-context, eNB1 pages the terminal.

Act 4D1-3: Paging fails, as the terminal has already moved to eNB2.

Act 4D1-4 through Act 4D1-5: eNB1 indicates paging failure to the MME, and uploads the MME mini-context, since the terminal can no longer be found at eNB1.

Act 4D1-6: MME sends paging message to relevant eNBs.

Act 4D1-7: Terminal receives the paging when it is connected to eNB2.

Act 4D1-8 through Act 4D1-12: The terminal performs a regular service request procedure.

Act 4D1-13: In a new type of message, the MME sets up packet forwarding from eNB1 to eNB2. In this data forwarding request message, the MME includes the eNB1 partial context key so that eNB1 can identify which buffered packets to forward. The MME also includes the IP@ and TED to send the packets to eNB2, which is the same GTP-U tunnel endpoint as the one used for S1-U, which the MME becomes aware of in Act 4D1-12. The MME may restrict this act to only the cases when X2 connectivity is set up between eNB1 and eNB2; however, packet forwarding is also possible, as long as data connectivity is properly provisioned, when X2 connectivity is not set up, so this aspect might not be considered by the MME.

Act 4D1-14: The previous act is acknowledged.

Act 4D1-15: Buffered packets are now forwarded from eNB1 to eNB2, which are then delivered to the terminal.

Act 4D1-16 through Act 4D1-17: The SGW is notified so that the downlink data path is switched from eNB1 to eNB2. From the SGW's point of view this appears as a handover. The MME can be aware of the need to notify the SGW based on eNB1's failed paging indication in Act 4D1-4.

Act 4D1-18: Downlink packets are now routed directly from the SGW to eNB2.

Act 4D1-19: The partial context in eNB1 is now released by the MME.

As an alternative way to set up packet forwarding, it is possible to use X2 messaging between eNB1 and eNB2 as shown in FIG. 4D2. In the example embodiment of FIG. 4D2, Act 4D2-12 and BD2-13 are executed where the eNB1 requests eNB2 to set up packet forwarding in Act 4D2-12, and eNB2 returns the packet forwarding endpoint in act 13. Note that acts 16-22 may be executed parallel to Act 4D2-11 through Act 4D2-15.

2.5 TAU from Another eNB (Idle Mode)

Figure 4E:
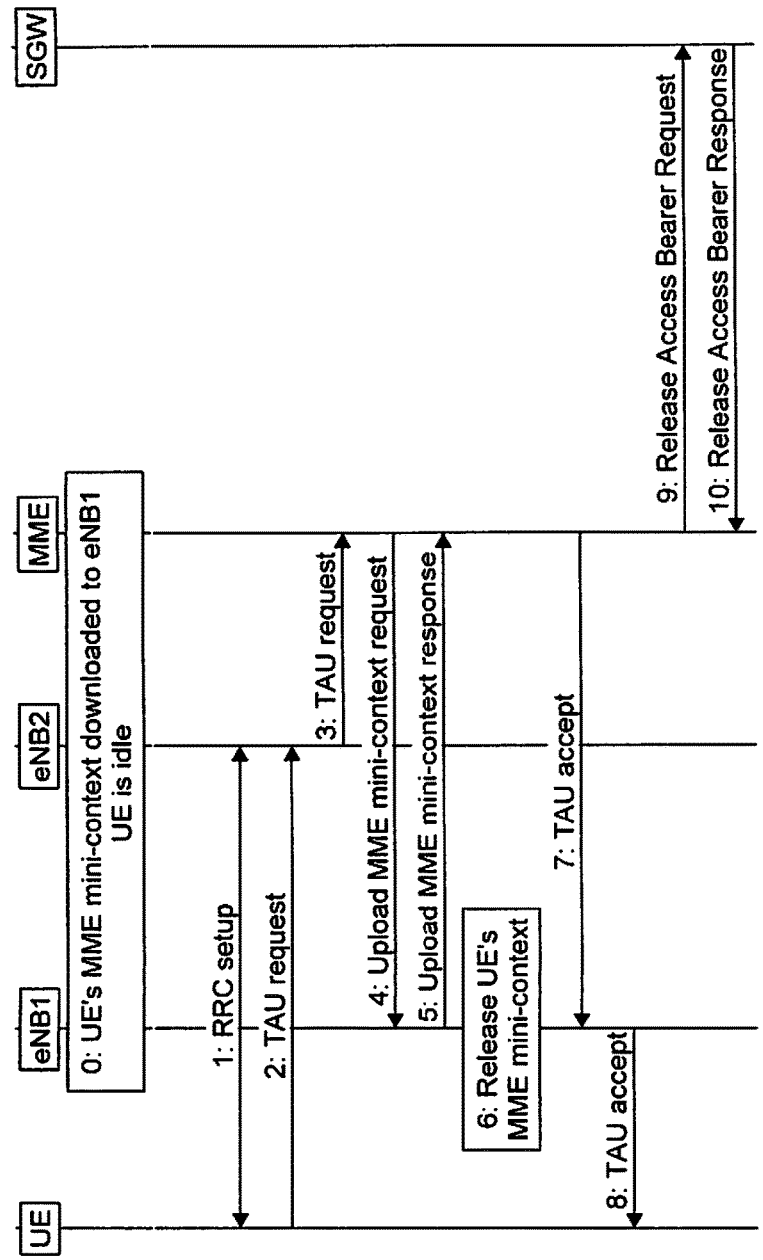

Any indication at the MME showing that the UE has moved triggers the MME to release the MME mini-context at the eNB so that a subsequent downlink packet will not be forwarded to the eNB which is no longer the current one. This takes place also at a TAU request which arrives from a new eNB1. FIG. 4E shows example acts in a situation of a TAU from another eNB (idle mode), included the following:

Act 4E-0: The process starts with that the MME mini-context is downloaded from MME to eNB1, when the UE is idle.

Act 4E-1: The terminal moves from eNB1 to eNB2 and sets up the RRC connection.

Act 4E-2 through Act 4E-3: Terminal sends TAU request (which may be a TAU due to mobility, or a periodic TAU) via eNB2.

Act 4E-4: MME detects that TAU arrives from eNB2 which is different from eNB1 where the mini-context is stored, and hence requests the eNB1 to upload the MME mini-context.

Act 4E-5: eNB1 uploads the fields of the MME mini-context which has changed. The change can be an update to the sequence number used for security.

Act 4E-6: eNB1 can now release the UE's mini-context, since it is now the MME which stores the up to date context.

Act 4E-7 through Act 4E-8: TAU procedure continues normally.

Act 4E-9 through Act 4E-10: The MME now informs the SGW that the terminal is idle by the Release Access Bearer Request message, which is acknowledged by the SGW. The terminal is now in idle state in all nodes. Subsequent packets will then trigger a regular idle to connected transition.

The TAU may also arrive at a different MME. This means that also a Context Request for the UE is a trigger to upload the MME mini-context.

2.6 Handover to Another eNB (Connected Mode)

Figure 4F:
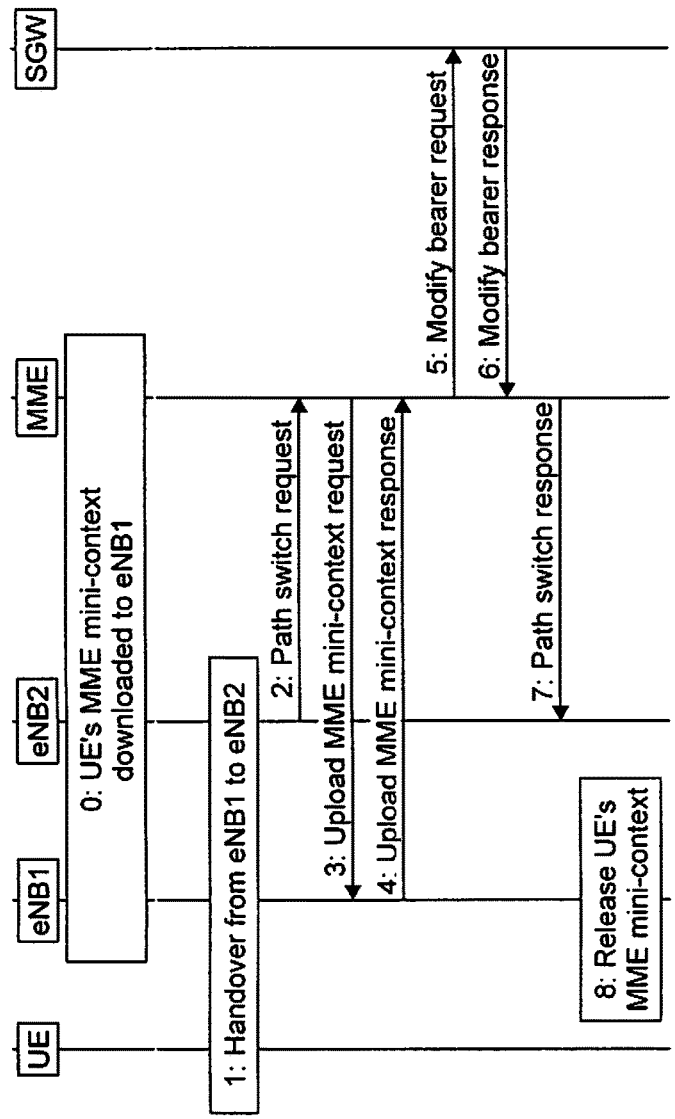

Similarly as in the TAU case, a mobility signalling from a new eNB triggers the release of the MME mini-context, as illustrated by FIG. 4F. Example acts of FIG. 4F include the following:

Act 4F-0: The process starts with the MME mini-context downloaded from MME to eNB1, when the UE is connected at eNB1.

Act 4F-1: The terminal performs a handover from eNB1 to eNB2.

Act 4F-2: eNB2 signals handover completion by sending Path switch request to MME.

Act 4F-3: MME detects that Path switch request arrives from eNB2 which is different from eNB1 where the mini-context is stored, and hence requests the eNB1 to upload the MME mini-context.

Act 4F-4: eNB1 uploads the fields of the MME mini-context which has changed. The change can be an update to the sequence number used for security.

Act 4F-5 through Act 4F-7: Handover procedure continues normally.

Act 4F-8: eNB1 can now release the UE's mini-context, since it is now the MME which stores the up to date context.

2.7 Uplink NAS Message

Figure 4G:
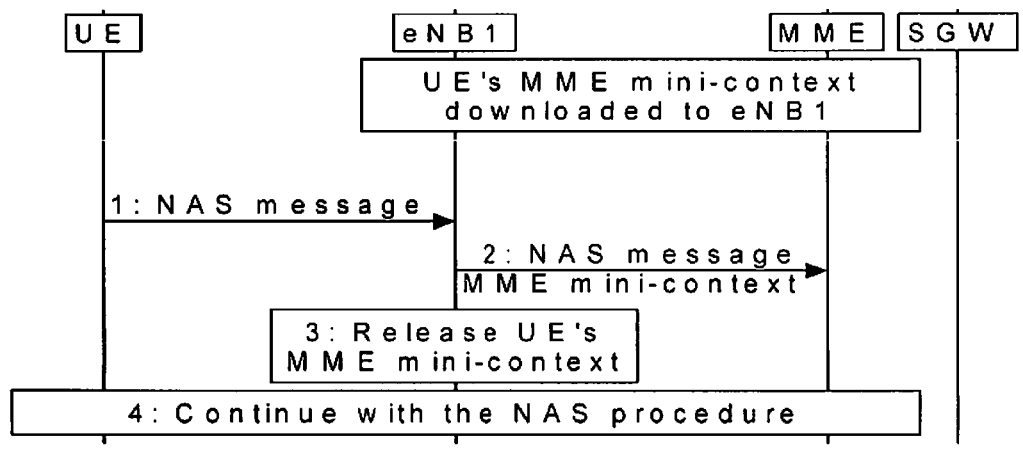

Any NAS messaging other than Service request triggers the MME mini-context to be released at the eNB, since the MME is not prepared to manage NAS signaling other than Service request so that eNB complexity is limited. Such is illustrated in FIG. 4G, which includes the following acts:

Act 4G-0: The process starts with the MME mini-context downloaded from MME to eNB1.

Act 4G-1: UE sends NAS message via eNB1.

Act 4G-2: eNB1 detects NAS message, and determines that it is different from a Service request. Consequently, the eNB appends the MME mini-context to the NAS message as it delivers it to the MME. The eNB1 sends the fields of the MME mini-context which have changed. The change can be an update to the sequence number used for security.

Act 4G-3: The MME mini-context in the eNB1 can now be released.

Act 4G-4: The rest of the NAS procedure is executed.

2.8 Downlink NAS Message

Figure 4H:
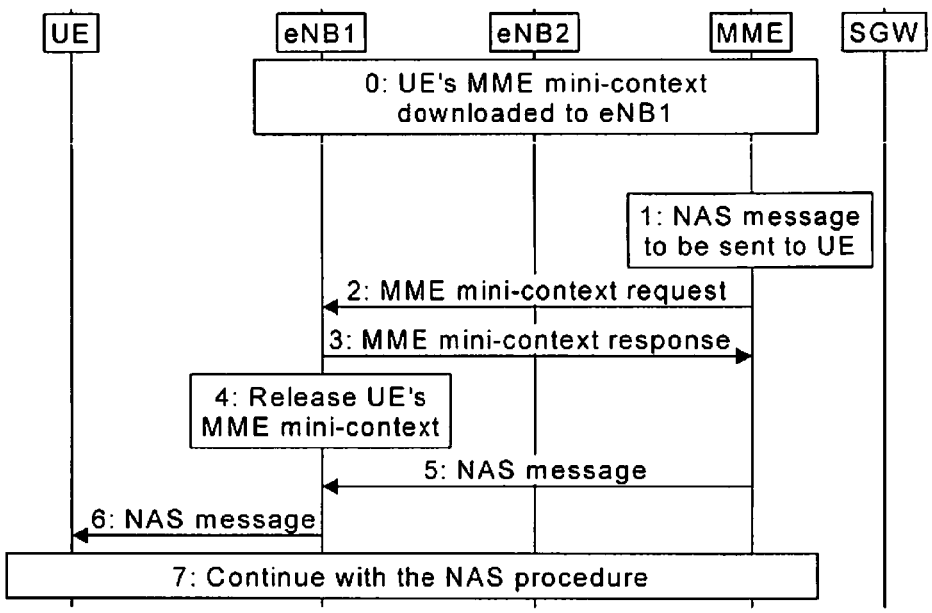

Similarly as for an uplink NAS message, a downlink NAS message triggers the MME mini-context to be released at the eNB, since the MME is not prepared to manage NAS signaling other than Service request so that eNB complexity is limited. Such is illustrated in FIG. 4H, which includes the following acts:

Act 4H-0: The process starts with the MME mini-context downloaded from MME to eNB1.

Act 4H-1: The MME has a NAS message to send to the UE. This may be triggered at the MME, or be the result of some message from the HSS or from the SGW.

Act 4H-2: The MME requests the mini-context to be uploaded from eNB1 to MME.

Act 4H-3: eNB1 uploads the MME mini-context to the MME. The eNB sends the fields of the MME mini-context which have changed. The change can be an update to the sequence number used for security.

Act 4H-4: The MME mini-context in the eNB1 can now be released.

Act 4H-5 through Act 4H-7: The NAS message is sent to the UE and the rest of the NAS procedure is executed. MME continues to handle NAS termination until execution of S1-release as illustrated by the Basic Flow of section 2.1 above.

Figure 5:
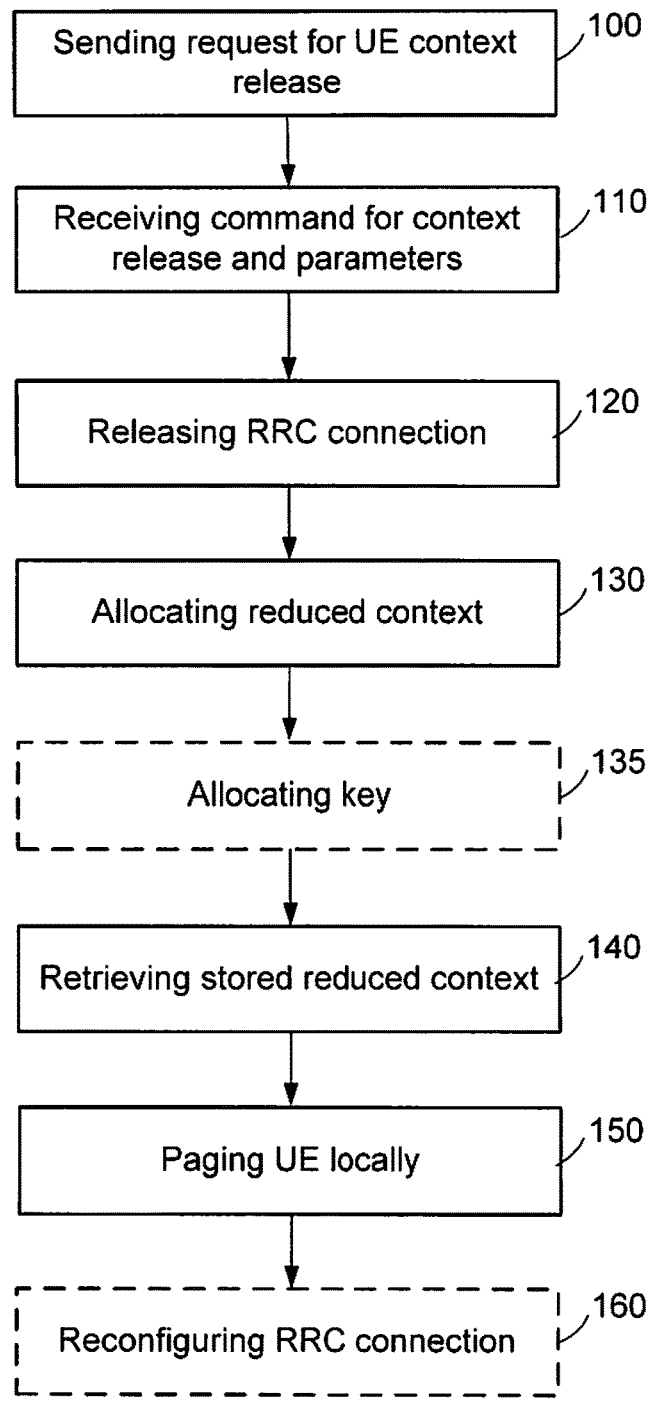
FIG. 5 is a flowchart showing a method performed by an eNB for reducing signaling in an Evolved Universal Terrestrial Radio Access Network relating to state changes in a User Equipment.

Turning now to FIG. 5 the main method for reducing signaling in the CN, relating to state changes in the UE 4 will be described. The method is performed in the eNB having a Radio Resource Control, RRC, connection with the UE. In a first step the eNB 2 is sending 100 a request for a UE context release to the MME 6 in response to that the UE 4 has been inactive during a predetermined time. The eNB 2 is then receiving 110 from the from the MME 6, a command for a UE context release together with parameters for enabling local eNB paging of the UE 4. After receiving the command for UE context release the RRC connection with the UE 4 is released in step 120.

The parameters that are received by the eNB 2 for performing local paging and other functions are allocated in step 130 to form or create a reduced context, which is stored in the memory 8 of the eNB 2. The reduced context may comprise information such as a System architecture evolution Temporary Mobile Station Identity, S-TMSI, a International Mobile Subscriber Identity, IMSI mod 1024 and/or a UE specific Discontinuous Reception, DRX. The reduced context may also comprise bearer and security configuration parameters.

When the RRC connection has been released the eNB2 may send a confirmation to the MME 6 that the RRC connection has been released.

The UE 4 is now in an idle mode without the SGW 10 and/or the MME 6 knowing this. If eNB 2 now receives a downlink packet for the UE 4, the eNB 2 will, in step 140, start retrieving the stored reduced context. The reduced context will be used for paging, in step 150, the UE 4 locally by means of paging parameters that are part of the reduced context. The step of retrieving the reduced context may also be initiated by the UE 4, which sends a service request to the eNB 2 for getting back to connected mode. In response thereto the eNB 2 retrieves, in step 140, the stored reduced context and reconfigures, in step 160, the RRC connection by means of the reduced context. This signaling is hidden from the SGW and or the MME, depending on which reduced context that is stored in the memory 8 of the eNB 2. Thus, according to the present disclosure it is possible for the UE 4 to go from connected to idle to connected mode again without any signaling with the SGW and/or the MME. Seeing it from the SGW and/or MME the UE 4 has been in a connected state whole the time.

In an exemplary embodiment the eNB 2 allocates, in step 135, a key comprising a DownLink Internet Protocol address, DL IP@, and a Tunnel End point IDentifier, TEID on S1-U for identifying the reduced context when a downlink package associated with the reduced context arrives. Depending on if signaling is to be hidden for the SGW or the SGW and the MME the reduced context may comprise different parameters. In the case where the signaling is hidden only for the SGW the reduced context is a partial UE context enabling the reconfiguring of the RRC connection between the UE 4 and the eNB 2. If the signaling is to be hidden for both SGW and the MME the reduced context is a mini MME context enabling the eNB 2 to handle a service request from the UE 4.

Figure 6:
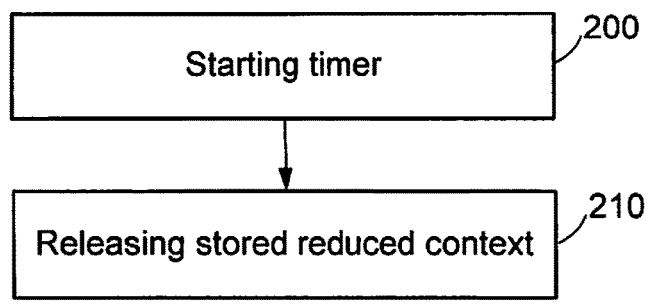
FIG. 6 is a flowchart showing an exemplary method for releasing the stored reduced context.
Figure 7:
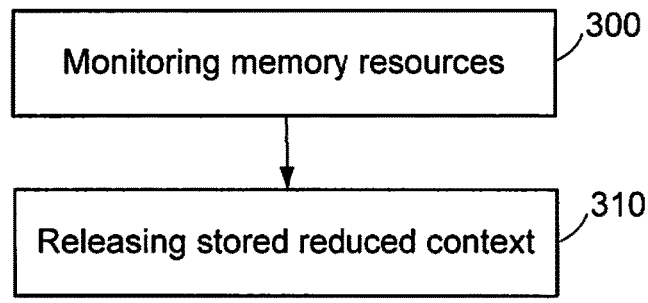
FIG. 7 is a flowchart showing another exemplary method for releasing the stored reduced context.

Turning now to FIG. 6 and FIG. 7 a method for releasing the reduced context is depicted. In the method in FIG. 6 the release is based on a timer function. Thus, in step 200, the eNB 2 starts a timer when the reduced context is stored. After that the timer is timed out the eNB 2 releases, in step 210, the stored reduced context. In FIG. 7 the release is instead based on the memory capacity, i.e. it may be released if memory resources are scarce. Thus, in step 300 the eNB 2 monitors the memory resources 8 in the eNB 2 and upon detection that a predetermined amount of the memory resources 8 are occupied releasing, in step 310 the reduced context.

3.0 Implementations

In an example embodiment and as depicted by way of example in FIG. 2, the entities (e.g., RRC entities), managers, controllers, and units which comprise one or more of the wireless terminal, base station (BS), Mobility Management Entity (MME), and/or serving gateway (SGW) may be realized by a machine platform. To this end, in one or more of the wireless terminal, base station (BS), Mobility Management Entity (MME), and/or serving gateway (SGW) FIG. 2 employs a broken line to represent a machine platform which comprises, e.g., these entities (e.g., RRC entities), managers, controllers, and units. It will be appreciated that, in at least some example embodiments and modes, the acts or steps performed one or more of the signaling diagram figures may be performed, sequenced, or otherwise arranged or executed by controllers of the various nodes or entities, including controllers previously referred to as "state change concealment controllers".

The terminology "machine platform" is a way of describing how the functional units may be implemented or realized by machine. The machine platform can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable for transmission mode selector 40 is that of a hardware circuit, e.g., an application specific integrated circuit (ASIC) wherein circuit elements are structured and operated to perform the various acts described herein.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

4.0 Advantages

Advantageously, the technology disclosed herein reduces the signaling load in the core network (SGW and MME). This is done in a way that does not affect the terminals. At uplink data, signaling at service requests from the UE is reduced in the core network with no signaling at all to the SGW. At downlink data, the eNB can perform the paging, i.e. no processing of Downlink Data Notifications or paging requests are necessary in the MME if the UE is reachable by the eNB.

In the first example embodiment, some signaling is still exposed to the MME, but the MME-SGW signaling is completely avoided. In the second example embodiment, the signaling is also hidden from the MME which results in higher signaling reduction at the MME, but the complexity in the eNB is higher. However, this complexity increase at the eNB is small compared to the what is gained by decreasing the signaling at the MME.

5.0 Abbreviations

The following is at least a partial list of abbreviations utilized herein:
DL Downlink
DRX Discontinuous Reception
eNB Evolved Node B
IMSI International Mobile Subscriber Identifier
MME Mobility Management Entity
M2M Machine to machine
MTC Machine type communication
RRC Radio Resource Control
SGW Serving GW
S-TMSI SAE Temporary Mobile Subscribed Identity
TA Tracking Area
TAU Tracking Area Update
TEID Tunnel Endpoint Identifier
UE User Equipment
UL Uplink

6.0 Example Embodiments

The technology disclosed thus encompasses the following non-limiting example

Embodiments Example Embodiment BS1

A Base Station Node Comprising:
a communications interface to a wireless terminal;
a communications interface to a Mobility Management Entity (MME);
a controller configured, upon inactivity of the wireless terminal:
  to send a UE context release request to the Mobility Management Entity (MME);
  to receive from the MME parameters necessary for paging the wireless terminal;
  to keep at least a partial UE context for the wireless terminal;
  to allocate a key to the kept UE partial context and to send the key to the Mobility Management Entity (MME).

Example Embodiment BS2

The base station of example embodiment BS1, wherein the controller is further configured, upon receipt of a downlink packet received from a serving gateway (SGW) and destined to the wireless terminal:
  to obtain the at least partial UE context;
  to page the wireless terminal in a cell served by the base station using the paging parameters previously received from the Mobility Management Entity (MME).

Example Embodiment BS3

A base station node comprising:
a communications interface to a wireless terminal;
a communications interface to a Mobility Management Entity (MME);
a controller configured, upon inactivity of the wireless terminal:
  to obtain, from a Mobility Management Entity (MME), a portion of the UE context for the wireless terminal which becomes a mini-context for the wireless terminal;
  to use the mini-context involving the wireless terminal so that the base station need not notify the Mobility Management Entity (MME) of a change of RRC state of the wireless terminal.

Example Embodiment BS4

The base station node of example embodiment BS3, wherein the controller is configured not to notify a serving gateway (SGW) of the change of RRC state of the wireless terminal.

Example Embodiment BS5

The base station node of example embodiment BS3, wherein the mini-context is sufficient to handle non-access stratum (NAS) functionality for a service request procedure involving the wireless terminal.

Example Embodiment BS6

The base station node of example embodiment BS3, wherein the mini-context comprises parameters necessary for paging the wireless terminal as well as at least part of a security context and at least part of a bearer context sufficient to re-establish the base station context after a service request.

Example Embodiment MME1

A core network entity comprising:
a communications interface to a base station;
a controller configured, upon receipt of a UE context release request received from a base station or due to inactivity of a wireless terminal served by the base station, to engage in one or more transactions involving the wireless terminal without notifying a serving gateway (SGW) of a change of RRC state of the wireless terminal.

Example Embodiment MME2

The network entity of example embodiment MME1, wherein the one or more transactions comprise a connected mode transaction.

Example Embodiment MME3

The network entity of example embodiment MME1, wherein the one or more transactions comprise at least one of:
  processing a service request from the wireless terminal when the wireless terminal is in a cell served by the base station;
  processing a service request from the wireless terminal when the wireless terminal has moved to a cell not served by the base station;
  downloading of a packet from the serving gateway and through the base station to the wireless terminal when the wireless terminal is in the cell served by the base station;
  downloading of a packet from the serving gateway to the wireless terminal when the wireless terminal is in the cell not served by the base station.

Example Embodiment MME4

The network entity of example embodiment MME1, wherein the controller is configured, upon receipt of the UE context release request received from the base station or due to inactivity of a wireless terminal served by the base station:
  to refrain from notifying a serving gateway (SGW) of the UE context release request;
  to receive from the base station a key to at least a partial UE context maintained by the base station;
  to provide the base station with parameters necessary for paging the wireless terminal.

Example Embodiment MME5

The network entity of example embodiment MME1, wherein the controller is further configured, upon receipt of a service request for the wireless terminal: to generate an initial context setup request; to provide the key to the base station; and to refrain from notifying the serving gateway (SGW) of the service request.

Example Embodiment MME6

The network entity of example embodiment E1, wherein the controller is further configured, upon receipt of a service request for the wireless terminal after the wireless terminal has moved to a cell served by another base station: to generate an initial context setup request; to notify the serving gateway (SGW) of a new S1-U endpoint for the wireless terminal; and, to command the base station to release the at least partial UE context.

Example Embodiment MME7

A core network entity comprising:
a communications interface to a base station;
a controller configured to provide to the base station, and for a wireless terminal served by the base station, a portion of a UE context which becomes a mini-context for the wireless terminal so that the base station need not notify the core network entity of a change of RRC state of the wireless terminal.

Example Embodiment MME8

A core network entity of example embodiment MME7, wherein the controller is further configured to store an identity of the base station where the mini-context is downloaded as well as to store the core network entity's own version of the UE context, and to upload the mini-context from the base station after the mini-context has been modified.

In addition to concerning the differing embodiments of base station nodes and core network entities/nodes, the technology disclosed herein also concerns wireless terminals and serving gateways (SGWs) which cooperate with or interact with the base station nodes and core network entities/nodes, as well as methods of operating a communication network comprising one or more of wireless terminals, nodes, or entities, and methods of operating or using the wireless terminal, nodes, and entities themselves.

Although the description above contains many specifics, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method performed by an evolved Node B, eNB, for reducing signaling in a Core Network, CN, relating to state changes in a User Equipment, UE, said eNB having a Radio Resource Control, RRC, connection with the UE, the method comprising,
sending a request for a UE context release to a Mobile Management Entity, MME, in response to that the UE has been inactive during a predetermined time,
receiving from the MME, a command for a UE context release together with parameters for enabling local eNB paging of the UE,
releasing the RRC connection,
allocating a reduced context based on the received parameters and storing the reduced context in a memory of the eNB,
retrieving the stored reduced context after receiving a downlink packet to the UE and after receiving a service request from the UE requesting that the UE return to a connected state,
reconfiguring the RRC connection by means of the reduced context, such that the signaling is hidden from a Serving GateWay, SGW, of the CN, and
paging the UE locally by means of the reduced context.

2. The method according to claim 1, further comprising starting a timer when storing the reduced context and upon timing out thereof,
releasing the stored reduced context.

3. The method according to claim 1, further comprising monitoring memory resources in the eNB and upon detection that a predetermined amount of the memory resources are occupied,
releasing the reduced context.

4. The method according to claim 1, wherein the reduced context comprises a System architecture evolution Temporary Mobile Station Identity, S-TMSI, an International Mobile Subscriber Identity, IMSI mod 1024 and/or a UE specific Discontinuous Reception, DRX.

5. The method according to claim 1, wherein the reduced context comprises bearer and security configuration parameters.

6. The method according to claim 1, further comprising allocating a key comprising a DownLink Internet Protocol address, DL IP@, and a Tunnel End point IDentifier, TEID on S1-U for identifying the reduced context when a downlink packet associated with the reduced context arrives.

7. The method according to claim 1, wherein the reduced context is a partial UE context enabling the reconfiguring of the RRC connection between the UE and the eNB without signaling with the SGW.

8. The method according to claim 1, wherein the reduced context is a mini MME context enabling the eNB to handle a service request from the UE without signaling with the MME.

9. An evolved Node B, eNB, for reducing signaling in a Core Network, CN, relating to state changes in a User Equipment, UE, said eNB being configured to have Radio Resource Control, RRC, connections with the UEs, said eNB comprising:
a communications interface (IF), via which, the eNB is connectable to the UE and a Mobile Management Entity, MME, a processor, and a computer readable medium storing computer program code which, when run in the processor, causes the eNB to:
send a request for a UE context release to a Mobile Management Entity, MME, in response to that the UE has been inactive during a predetermined time,
receive, from the MME, a command for a UE context release together with parameters for enabling local eNB paging of the UE,
release the RRC connection,
allocate a reduced context based on the received parameters and storing the reduced context in a memory of the eNB,
retrieve the stored reduced context after receiving a downlink packet to the UE and after receiving a service request from the UE requesting that the UE return to a connected state,
reconfigure the RRC connection by means of the reduced context, such that the signaling is hidden from a Serving GateWay, SGW, of the CN, and
page the UE locally by means of the reduced context.

10. The eNB according to claim 9, which further is caused to:
  start a timer when the reduced context is stored and upon timing out thereof,
  release the stored reduced context.

11. The eNB according to claim 9, which is further caused to:
  monitor memory resources in the eNB and upon detection that a predetermined amount of the memory resources are occupied,
  release the reduced context.

12. The eNB according to claim 9 wherein the reduced context comprises a System architecture evolution Temporary Mobile Station Identity, S-TMSI, an International Mobile Subscriber Identity, IMSI mod 1024 and/or a UE specific Discontinuous Reception, DRX.

13. The eNB according to claim 9, wherein the reduced context comprises bearer and security configuration parameters.

14. The eNB according to claim 9, which is further caused to allocate a key comprising a DownLink Internet Protocol address, DL IP@, and a Tunnel End point IDentifier, TEID on S1-U for identifying the reduced context when a downlink packet associated with the reduced context arrives.

15. The eNB according to claim 9, wherein the reduced context is a partial UE context usable to cause the eNB to reconfigure the RRC connection between the UE and the eNB without signaling with the SGW.

16. The eNB according to claim 9, wherein the reduced context is a mini MME context usable to cause the eNB to handle a service request from the UE such that the signaling is hidden both from the MME and the SGW.

* * * * *